US012742997B2

(12) United States Patent
Han et al.

(10) Patent No.: US 12,742,997 B2
(45) Date of Patent: Sep. 22, 2026

(54) PROGRAMMABLE PHOTONIC CIRCUIT

(71) Applicants: DAEGU GYEONGBUK INSTITUTE OF SCIENCE AND TECHNOLOGY, Daegu (KR); KOREA ADVANCED INSTITUTE OF SCIENCE AND TECHNOLOGY, Daejeon (KR)

(72) Inventors: Sangyoon Han, Daegu (KR); Kyoungsik Yu, Daejeon (KR)

(73) Assignees: DAEGU GYEONGBUK INSTITUTE OF SCIENCE AND TECHNOLOGY, Daegu (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 398 days.

(21) Appl. No.: 18/315,829

(22) Filed: May 11, 2023

(65) Prior Publication Data

US 2023/0367175 A1 Nov. 16, 2023

(30) Foreign Application Priority Data

May 13, 2022 (KR) ........................ 10-2022-0059031
Feb. 16, 2023 (KR) ........................ 10-2023-0020909

(51) Int. Cl.
*G02F 1/313* (2006.01)

(52) U.S. Cl.
CPC .................................. *G02F 1/313* (2013.01)

(58) Field of Classification Search
CPC ...................................................... G02F 1/313
See application file for complete search history.

(56) References Cited

U.S. PATENT DOCUMENTS 10,509,173 B2 * 12/2019 Seyedi .................. G02B 6/293
10,509,175 B2 * 12/2019 Tu ....................... G02B 6/3502
(Continued)

FOREIGN PATENT DOCUMENTS

KR 10-1710813 B1 2/2017
KR 10-1720434 B1 3/2017
(Continued)

OTHER PUBLICATIONS

Yichen Shen et al., "Deep learning with coherent nanophotonic circuits", Nature Photonics, Jun. 12, 2017, pp. 441-447, vol. 11.
(Continued)

*Primary Examiner* — Thomas A Hollweg
*Assistant Examiner* — Marc E Manheim
(74) *Attorney, Agent, or Firm* — Sughrue Mion, PLLC

(57) ABSTRACT

The provided programmable photonic circuit includes a tunable optical coupler, an optical phase shifter, and a control unit. First and second waveguides are provided in a first section corresponding to each other in the tunable optical coupler, and the tunable optical coupler includes a first actuator to adjust optical coupling efficiency of an optical signal between the first and second waveguides. One waveguide of the first and second waveguides, and a perturbation waveguide are provided in a second section corresponding to each other in the optical phase shifter, and the optical phase shifter includes a second actuator to change the phase of an optical signal traveling through the one waveguide, by changing an effective refractive index of an optical mode of the one waveguide according to the gap between the one waveguide and the perturbation waveguide. The control unit controls driving signals applied to the first and second actuators.

19 Claims, 43 Drawing Sheets

(56) References Cited

U.S. PATENT DOCUMENTS

| | | | | |
|---|---|---|---|---|
| 10,763,974 | B2 | 9/2020 | Bunandar et al. | |
| 11,237,335 | B1 | 2/2022 | Moebius et al. | |
| 2002/0039467 | A1 * | 4/2002 | Amantea | G02B 6/3536 385/16 |
| 2015/0365177 | A1 | 12/2015 | Blumenthal et al. | |
| 2017/0131615 | A1 | 5/2017 | Park et al. | |
| 2021/0132650 | A1 | 5/2021 | Lin et al. | |
| 2024/0061280 | A1 * | 2/2024 | Arbore | G02F 1/0134 |

FOREIGN PATENT DOCUMENTS

| | | | | |
|---|---|---|---|---|
| KR | 10-2064860 | B1 | 1/2020 | |
| KR | 10-2272597 | B1 | 7/2021 | |
| WO | 2017/065971 | A1 | 4/2017 | |
| WO | WO-2017148937 | A1 * | 9/2017 | G02B 6/12007 |
| WO | WO-2022006677 | A1 * | 1/2022 | G02F 1/0136 |

OTHER PUBLICATIONS

Caterina Taballione et al., "8×8 reconfigurable quantum photonic processor based on silicon nitride waveguides", Optics Express, Sep. 16, 2019, pp. 26842-26857, vol. 27, No. 19.

J. Feldmann et al., "Parallel convolutional processing using an integrated photonic tensor core", Nature, Jan. 7, 2021, pp. 52-61, vol. 589.

Sangyoon Han et al., "Large-scale silicon photonic switches with movable directional couplers", Optica, Apr. 2015, pp. 370-375, vol. 2, No. 4.

Pierre Edinger et al., "Silicon photonic microelectromechanical phase shifters for scalable programmable photonics", Optics Letters, Nov. 15, 2021, pp. 5671-5674, vol. 46, No. 22.

Tae Joon Seok et al., "Wafer-scale silicon photonic switches beyond die size limit", Optica, Apr. 2019, pp. 490-494, vol. 6, No. 4.

Wim Bogaerts et al., "MORPHIC: Programmable photonic circuits enabled by silicon photonic MEMS", 18 pages.

Alain Y. Takabayashi et al., Continuously Tunable Silicon Photonic Mems, 2×2 Power Coupler 4 pages.

Wim Bogaerts, "Programmable Photonics", Photonics Research Group, OFC 2021, Jun. 8, 2021, pp. 1-68.

Wim Bogaerts et al., "Programmable photonic circuits", Nature, Oct. 8, 2020, pp. 207-216, vol. 586.

* cited by examiner

FIG. 11A

As designed 450 nm 450 nm

12

14

200 nm

With fabrication error w' w' g'

$\Delta w/2$ $\Delta w/2 = -\Delta g/2$

Actuator arm
23a
23b
25a
25b
24
B
A
B'
A'
23
23a
24
25
26
25a
14
21,221
x
y
z

PROGRAMMABLE PHOTONIC CIRCUIT

CROSS-REFERENCE TO RELATED APPLICATIONS

This application is based on and claims priority under 35 U.S.C. § 119 to Korean Patent Application Nos. 10-2022-0059031, filed on May 13, 2022 and 10-2023-0020909, filed on Feb. 16, 2023, in the Korean Intellectual Property Office, the disclosures of which are incorporated by reference herein in their entireties.

BACKGROUND

1. Field

A programmable photonic circuit is disclosed.

This work was supported by the Samsung Science & Technology Foundation [SRFC-IT2002-04].

2. Description of the Related Art

Programmable photonic integrated circuits (PPICs) have been extensively studied in recent years as they may function as matrix multipliers and may be programmed into desired photonic circuits. PPICs may be scaled up to be developed into optical systems variously applicable to the field of fixed and quantum optics.

A tunable optical coupler and an optical phase shifter are basic components of a PPIC. The extent to which a PPIC is scalable is determined by the optical loss, power consumption, and area of the two basic components. An optical gate capable of matrix multiplication may be made by combining these two elements with each other, and a PPIC may be made by connecting a plurality of optical gates to each other.

In PPICs in the art, an optical phase shifter is configured by using an external stimulus (e.g., heat, pressure, electric field, etc.) to change the effective refractive index of a material constituting a waveguide. In addition, a tunable optical coupler is configured as a secondary product by combining the optical phase shifter with a Mach-Zehnder interferometer (MZI) structure. The optical phase shifter needs to change the optical path length of passing light by at most one wavelength, and changing the optical path by one wavelength may be performed by increasing the refractive index change amount by using high power, or increasing the length of the waveguide constituting the optical phase shifter to increase the interaction length of the light. In addition, a tunable optical coupler configured by coupling an optical phase shifter with an MZI has a high optical loss and is difficult to be integrated in a limited area. As such, when the power consumption is large or the length of the waveguide is long, it is difficult to simultaneously drive a large number of components, or integrate them in a limited area at once, and the optical loss is large, which hinders the expansion of the scale of the PPIC.

SUMMARY

Provided is a programmable photonic circuit including a tunable optical coupler and an optical phase shifter.

Provided is a programmable photonic circuit with low power consumption and low optical loss, and capable of integration in a limited area.

Provided is a programmable photonic circuit that may expand a programmable photonic integrated circuit (PPIC) to a large scale.

Additional aspects will be set forth in part in the description which follows and, in part, will be apparent from the description, or may be learned by practice of the presented embodiments of the disclosure.

According to an aspect of the disclosure, a programmable photonic circuit includes a tunable optical coupler in which a first waveguide and a second waveguide are provided in a first section corresponding to each other, and including a first actuator to move any one of the first waveguide and the second waveguide, as a movable waveguide, in a first moving direction, the tunable optical coupler being configured to adjust optical coupling efficiency of an optical signal between the first waveguide and the second waveguide, an optical phase shifter in which one waveguide of the first waveguide and the second waveguide, and a perturbation waveguide are provided in a second section corresponding to each other, and including a second actuator to move any one of the one waveguide and the perturbation waveguide, as a movable waveguide, in the second section, in a second moving direction perpendicular to the first moving direction, the optical phase shifter being configured to change a phase of an optical signal traveling through the one waveguide, by changing an effective refractive index of an optical mode of the one waveguide according to adjustment of a gap between the one waveguide and the perturbation waveguide, and a control unit configured to control driving signals applied to the first actuator and the second actuator, wherein each of the first actuator and the second actuator includes a fixed part and a movable part that is provided to be movable with respect to the fixed part and move the movable waveguide under control by the control unit, and a driving signal is applied from the control unit to the fixed part of at least one actuator of the first actuator and the second actuator.

Any one of the first moving direction and the second moving direction may be a vertical direction and the other may be a horizontal direction.

The one waveguide and the perturbation waveguide may have different cross-sectional areas.

The cross-sectional area of the perturbation waveguide may be less than the cross-sectional area of the one waveguide.

The perturbation waveguide may be a separate structure.

The at least one actuator may include a microelectromechanical systems (MEMS)-based actuator.

The movable part of the at least one actuator may be electrically grounded.

The first actuator may be provided to move any one of the first waveguide and the second waveguide, as the movable waveguide, in a vertical direction.

The first actuator may include a first fixed part and a first movable part to move the movable waveguide in the vertical direction, and combs to engage without colliding with each other in a direction forming an angle with respect to a driving axis of the first movable part may be formed in the first fixed part and the first movable part, respectively.

The first actuator may be driven in an electrostatic manner, based on the driving signal being applied to the first fixed part and the first movable part being electrically grounded.

The second actuator may be provided to adjust the one waveguide and the perturbation waveguide in a direction closer to each other when the driving signal is applied.

The second actuator may be provided to move any one of the one waveguide and the perturbation waveguide in a horizontal direction in the second section.

The second actuator may include a second fixed part and a second movable part to move any one of the one waveguide and the perturbation waveguide, as the movable waveguide, in the horizontal direction, combs to engage without colliding with each other in a direction in which the second movable part is moved may be formed in the second fixed part and the second movable part, respectively, and a length at which the comb of the second fixed part and the comb of the second movable part engage each other may be changed as the second movable part is moved.

The second actuator may be driven in an electrostatic manner, based on the driving signal being applied to the second fixed part and the second movable part being electrically grounded.

The first waveguide and the second waveguide may be formed as closed ring-shaped waveguides each having at least two first sections and one second section, and alternately arranged to form a two-dimensional array and thus configure a recirculating photonic circuit, and each of unit cells may include the first waveguide or the second waveguide and at least one tunable optical coupler, and may or may not include at least one optical phase shifter.

The unit cells may include a first unit cell including the first waveguide, at least two tunable optical couplers, and one optical phase shifter, and a second unit cell including the second waveguide, at least one tunable optical coupler, and one optical phase shifter.

The photonic circuit may further include an array in which the first unit cells and the second unit cells are alternately arranged.

The unit cells may further include a third unit cell including the first waveguide or the second waveguide and at least one tunable optical coupler.

The photonic circuit may further include an optical gate to perform 2×2 unitary transformation.

The photonic circuit may further include an optical gate array to configure an N×N feed-forward photonic circuit.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11A exemplarily illustrates an example of a manufacturing error of a tunable optical coupler.

FIG. 14 schematically illustrates a programmable photonic circuit according to another embodiment;

FIG. 25 is a plan view schematically illustrating an example of a first actuator of a tunable optical coupler applied to a programmable photonic circuit according to an embodiment;

DETAILED DESCRIPTION

Figure 1:
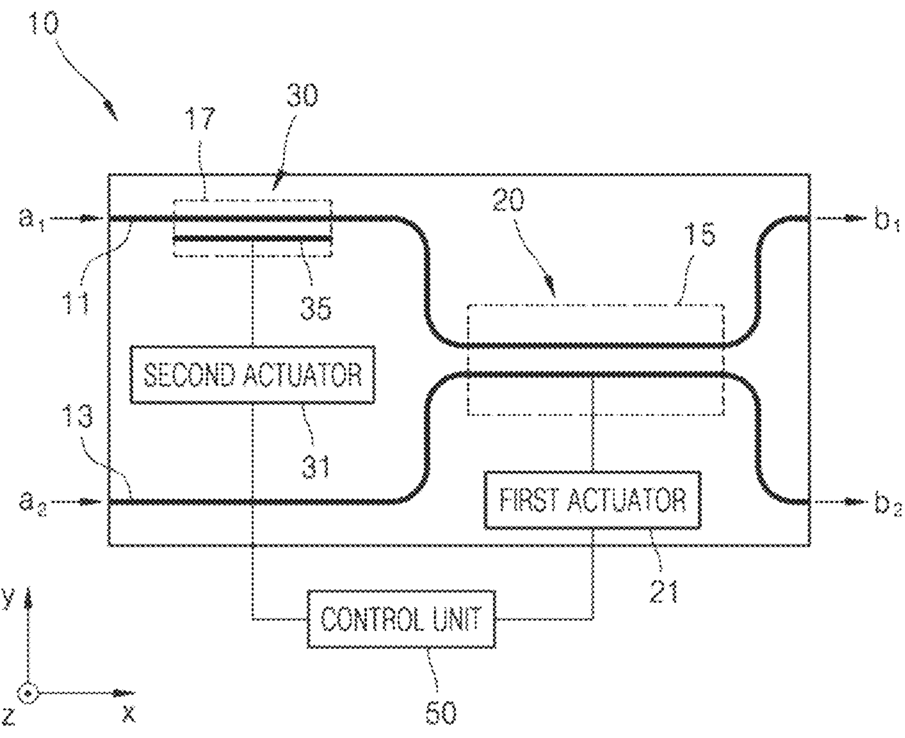
FIG. 1 schematically illustrates a programmable photonic circuit according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. In the following drawings, like reference numerals refer to like elements, and sizes of elements in the drawings may be exaggerated for clarity and convenience of description. Embodiments described below are merely exemplary, and various modifications are possible from these embodiments.

In the following descriptions, when an element is referred to as being "on" or "above" another element, the element may directly contact a top/bottom/left/right portion of the other element, or may be on/under/next to the other element with intervening elements therebetween. A singular expression may include a plural expression unless they are definitely different in a context. In addition, when an element is referred to as "including" a component, the element may additionally include other components rather than excluding other components as long as there is no particular opposing recitation.

The term "the" and other demonstratives similar thereto may include a singular form and plural forms. Operations of a method described herein may be performed in any suitable order unless otherwise indicated herein or otherwise clearly contradicted by context, and the disclosure is not limited to the described order of the operations.

In addition, as used herein, terms such as " . . . er (or)", " . . . unit", " . . . module", etc., denote a unit that performs at least one function or operation, which may be implemented as hardware or software or a combination thereof.

Line connections or connection members between elements depicted in the drawings represent functional connections and/or physical or circuit connections by way of example, and in actual applications, they may be replaced or embodied with various suitable additional functional connections, physical connections, or circuit connections.

The use of any and all examples, or exemplary language provided herein, is intended merely to describe the technical spirit of the disclosure in more detail and does not pose a limitation on the scope of the disclosure unless otherwise claimed.

Figure 2:
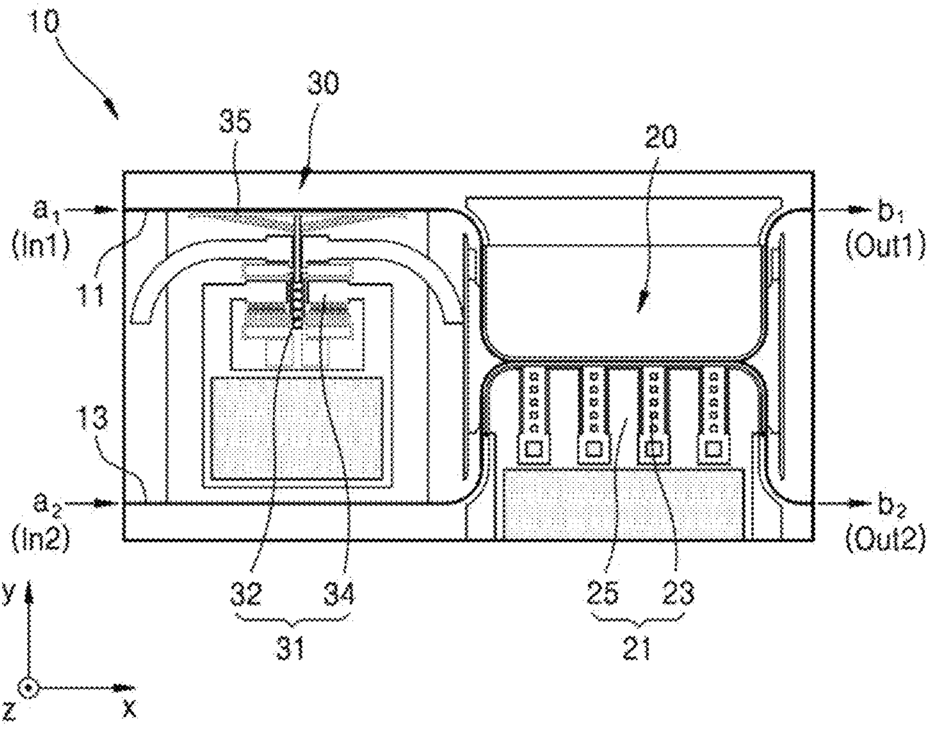
FIG. 2 schematically illustrates an implementation example of the photonic circuit of FIG. 1.

FIG. 1 schematically illustrates a programmable photonic circuit 10 according to an embodiment, and FIG. 2 schematically illustrates an implementation example of the photonic circuit 10 of FIG. 1. In FIGS. 1 and 2, $a_1$ and $a_2$ denote optical signals input to a first waveguide 11 and a second waveguide 13, respectively, and $b_1$ and $b_2$ denote optical signals transmitted through the first waveguide 11 and the second waveguide 13 via the photonic circuit 10, respectively. In FIG. 2, In1 denotes an input of the optical signal $a_1$ to the first waveguide 11, In2 denotes an input of the optical signal $a_2$ to the second waveguide 13, Out1 denotes an output of the optical signal $b_1$ having passed through the photonic circuit 10 and traveling through the first waveguide 11, and Out2 denotes an output of the optical signal $b_2$ having passed through the photonic circuit 10 and traveling through the second waveguide 13. Meanwhile, FIG. 2 illustrates an example in which a tunable optical coupler 20 and an optical phase shifter 30 have a size of approximately 100 μm to 200 μm, but the embodiment is not limited thereto, and the size thereof may vary depending on design conditions.

Referring to FIGS. 1 and 2, the programmable photonic circuit 10 may include the tunable optical coupler 20 configured to adjust the optical coupling efficiency between the first waveguide 11 and the second waveguide 13, the optical phase shifter 30 configured to convert the phase of an optical signal according to adjustment of the gap between one of the first waveguide 11 and the second waveguide 13 and a perturbation waveguide 35, a tunable optical coupler 20, and a control unit 50 configured to control the tunable optical coupler 20 and the optical phase shifter 30. A phase converted by the optical phase shifter 30 may be tunable. That is, the programmable photonic circuit 10 according to an embodiment may be provided with the optical phase shifter 30 to operate as a tunable optical phase shifter.

Meanwhile, although FIGS. 1 and 2 illustrate an example in which the photonic circuit 10 according to an embodiment includes a tunable optical gate capable of 2×2 unitary transformation, the embodiment is not limited thereto. The programmable photonic circuit 10 according to an embodiment includes at least one tunable optical coupler 20 and at least one optical phase shifter 30 in unit configuration, and may be provided in various ways. For example, the photonic circuit 10 according to an embodiment may be modified into various configurations, for example, as will be described below, may include a tunable optical gate array provided to configure an N×N feed-forward photonic circuit (e.g., 100 of FIG. 13), a recirculating programmable photonic circuit (e.g., 200 of FIG. 14), and the like, in addition to the tunable optical gate capable of 2×2 unitary transformation.

The tunable optical coupler 20 may include the first waveguide 11, the second waveguide 13, and a first actuator 21. The first waveguide 11 and the second waveguide 13 may be provided to correspond to each other in a first section 15 of the photonic circuit 10, and the first actuator 21 may be provided to move any one of the first waveguide 11 and the second waveguide 13 in a first moving direction in the first section 15. The first moving direction is a direction in which the gap between the first waveguide 11 and the second waveguide 13 is changed, and may be a horizontal direction or a vertical direction. Here, the horizontal direction may be a direction parallel to the plane on which the photonic circuit 10 is arranged, and the vertical direction may be a direction perpendicular to the plane on which the photonic circuit 10 is arranged.

The first section 15 may refer to a region in which the first waveguide 11 and the second waveguide 13 are arranged in parallel to each other and the tunable optical coupler 20 is configured. In the first section 15, the first waveguide 11 and the second waveguide 13 may be arranged such that the gap therebetween causes the optical coupling rate to be adjusted according to the driving of the first actuator 21. In addition, the first section 15 may be determined to include a length at which optical coupling between the first waveguide 11 and the second waveguide 13 may be sufficiently achieved.

Meanwhile, any one of the first waveguide 11 and the second waveguide 13 may be a movable waveguide that is moved in the first moving direction by the first actuator 21. FIGS. 1 and 2 illustrate an example in which the second waveguide 13 is a movable waveguide.

As illustrated in FIGS. 1 and 2, the first actuator 21 may be provided to move the second waveguide 13 in the first moving direction. For example, a first movable part 23 of the first actuator 21 may be coupled to the second waveguide 13.

As another example, the first actuator 21 may be provided to move the first waveguide 11 in the first moving direction. In a case in which the first waveguide 11 is moved by the first actuator 21, the movable waveguide may be the first waveguide 11. As such, any one of the first waveguide 11 and the second waveguide 13 may be determined as the movable waveguide according to the position at which the first movable part 23 of the first actuator 21 is coupled.

Figure 3:
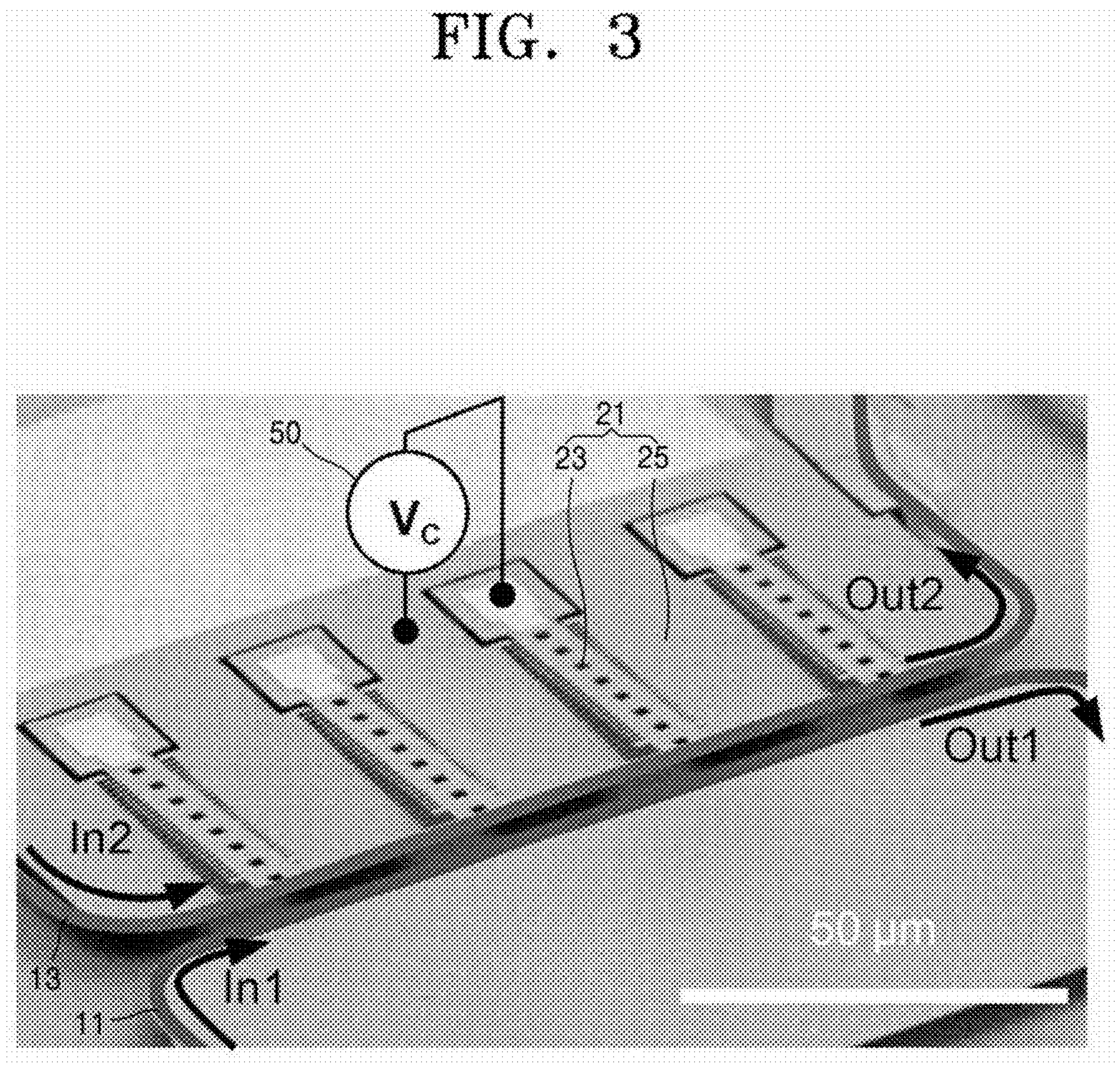
FIG. 3 is an enlarged view of a first actuator of FIG. 2.
Figure 4:
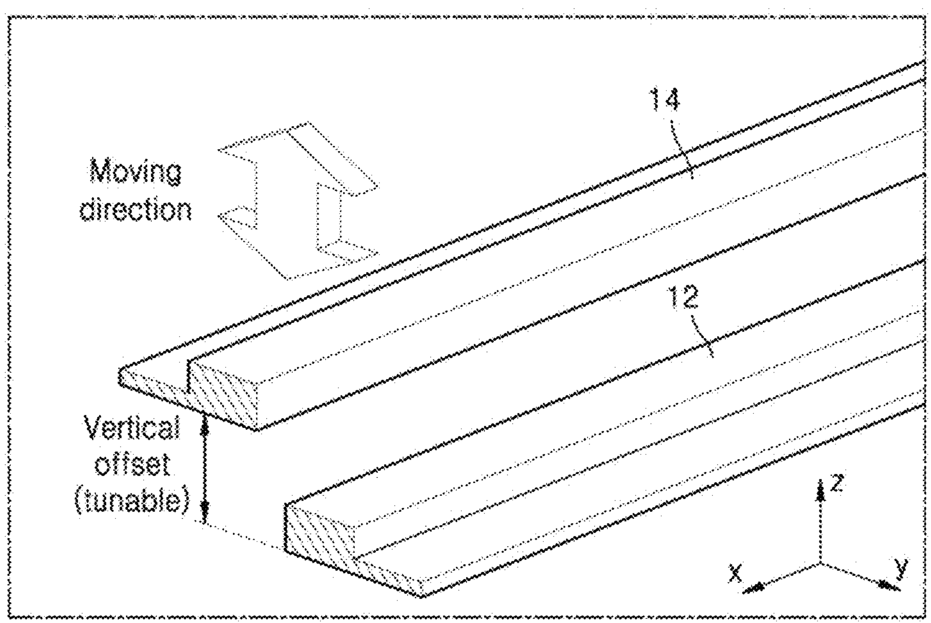
FIG. 4 illustrates a movement of a movable waveguide in a vertical direction by driving of a first actuator in a photonic circuit according to an embodiment.

Meanwhile, in the tunable optical coupler 20, the first moving direction of the movable waveguide may be the horizontal direction or the vertical direction. FIG. 3 is an enlarged view of the first actuator 21 of FIG. 2 and illustrates an example in which the first moving direction of the second waveguide 13, which is the movable waveguide, is the vertical direction. FIG. 4 illustrates a movement of a movable waveguide 14 in the vertical direction by the driving of the first actuator 21 in the photonic circuit 10 according to an embodiment. Reference numeral 12 in FIG. 4 denotes a fixed waveguide.

As exemplarily illustrated in FIGS. 2 to 4, the first actuator 21 may be provided to move the movable waveguide 14, for example, the second waveguide 13, in the vertical direction. In a case in which the second waveguide 13 is moved by the first actuator 21, the first waveguide 11 may correspond to the fixed waveguide 12 in the tunable optical coupler 20. As another example, the first waveguide 11 may be provided to be movable by the first actuator 21, and in this case, the first waveguide 11 may correspond to the movable waveguide 14 and the second waveguide 13 may correspond to the fixed waveguide 12. Although an example is herein described in which the first actuator 21 is provided to move the second waveguide 13 and the moving direction in which the second waveguide 13 is moved is the vertical direction, the embodiment is not limited thereto.

As exemplarily illustrated in FIGS. 2 and 3, the first actuator 21 may be, for example, a microelectromechanical systems (MEMS)-based actuator. The first actuator 21 may include a first fixed part 25 and the first movable part 23 provided to be movable with respect to the first fixed part 25 to move the second waveguide 13, that is, the movable waveguide 14, under control by the control unit 50. The first movable part 23 may be coupled to the second waveguide 13. The first actuator 21 may move the first movable part 23 with respect to the first fixed part 25 by a driving signal applied from the control unit 50, for example, a driving voltage $V_c$, such that the second waveguide 13 coupled to the first movable part 23 is moved in the first moving direction, for example, in the vertical direction.

As exemplarily illustrated in FIG. 4, a vertical offset between the fixed waveguide 12 and the movable waveguide 14, for example, between the first waveguide 11 and the second waveguide 13 is tunable by applying the driving voltage $V_c$ from the control unit 50 to the first actuator 21 to move the movable waveguide 14, for example, the second waveguide 13, in the first moving direction, i.e., in the vertical direction, and accordingly, the optical coupling efficiency between the first waveguide 11 and the second waveguide 13 may be adjusted.

According to the programmable photonic circuit 10 according to an embodiment, the driving voltage $V_c$ from the control unit 50 may be applied, for example, to the first fixed part 25 of the first actuator 21, and the first movable part 23 of the first actuator 21 may be electrically grounded. The first actuator 21 may be provided to be driven in an electrostatic manner. Accordingly, the first actuator 21 consumes power only during operation, and the power consumption during operation may also be significantly low.

Meanwhile, as exemplarily illustrated in FIG. 4, the cross-sectional areas of the fixed waveguide 12 and the movable waveguide 14, for example, the cross-sectional areas of the first waveguide 11 and the second waveguide 13, may be equal to each other. As another example, the cross-sectional areas of the first waveguide 11 and the second waveguide 13 may be different from each other.

Referring back to FIGS. 1 and 2, the optical phase shifter 30 may include any one of the first and second waveguides 11 and 13, the perturbation waveguide 35, and a second actuator 31. For example, the optical phase shifter 30 may be provided in a second section 17 of the photonic circuit 10, and may include the first waveguide 11, the perturbation waveguide 35, and the second actuator 31. The perturbation waveguide 35 may be provided to correspond to, for example, the first waveguide 11 in the second section 17, and may be arranged adjacent to the first waveguide 11. As another example, the optical phase shifter 30 may include the second waveguide 13, the perturbation waveguide 35, and the second actuator 31. In this case, the perturbation waveguide 35 may be provided to correspond to the second waveguide 13, and may be arranged adjacent to the second waveguide 13 to form the second section 17. Hereinafter, an example will be described in which the perturbation waveguide 35 is arranged adjacent to the first waveguide 11 and the optical phase shifter 30 is provided on the waveguide path of the first waveguide 11, but the embodiment is not limited thereto. The perturbation waveguide 35 may be arranged adjacent to the second waveguide 13, and the optical phase shifter 30 may be provided on the waveguide path of the second waveguide 13.

For example, the second actuator 31 may be provided to move any one of the first waveguide 11 and the perturbation waveguide 35 in a second moving direction, to adjust the gap between the first waveguide 11 and the perturbation waveguide 35.

The second section 17 may refer to, for example, a region in which the first waveguide 11 and the perturbation waveguide 35 are arranged in parallel to each other and the optical phase shifter 30 is configured. By adjusting the gap between the first waveguide 11 and the perturbation waveguide 35 according to the driving of the second actuator 31 to change the effective refractive index of the optical mode of the first waveguide 11, the phase of light traveling through the first waveguide 11 may be changed.

The second section 17 may correspond to, for example, the length of the perturbation waveguide 35 arranged in parallel to the first waveguide 11. The perturbation waveguide 35 may be a separate structure having a length encompassing the second section 17. The perturbation waveguide 35 may be provided to have a length for causing a desired change in the phase of the light traveling through the first waveguide 11 by changing the effective refractive index of the optical mode of the adjacent first waveguide 11.

As illustrated in FIGS. 1 and 2, the optical phase shifter 30 may be provided on the waveguide path of the first waveguide 11 such that the perturbation waveguide 35 is arranged adjacent to the first waveguide 11, and the second actuator 31 is provided to move any one of the perturbation waveguide 35 and the first waveguide 11 in the second moving direction. FIGS. 1 and 2 illustrate an example in which the second actuator 31 is provided to move the perturbation waveguide 35 in the second moving direction.

The second moving direction may be, for example, a direction perpendicular to the first moving direction. For example, in a case in which the first moving direction is the vertical direction, the second moving direction may be the horizontal direction. In a case in which the first moving direction is the horizontal direction, the second moving direction may be the vertical direction. For example, the second actuator 31 may be provided to move any one of the first waveguide 11 and the perturbation waveguide 35 in the horizontal direction. Here, the horizontal direction may be a direction parallel to the plane on which the photonic circuit 10 is arranged, and the vertical direction may be a direction perpendicular to the plane on which the photonic circuit 10 is arranged.

Figure 5:
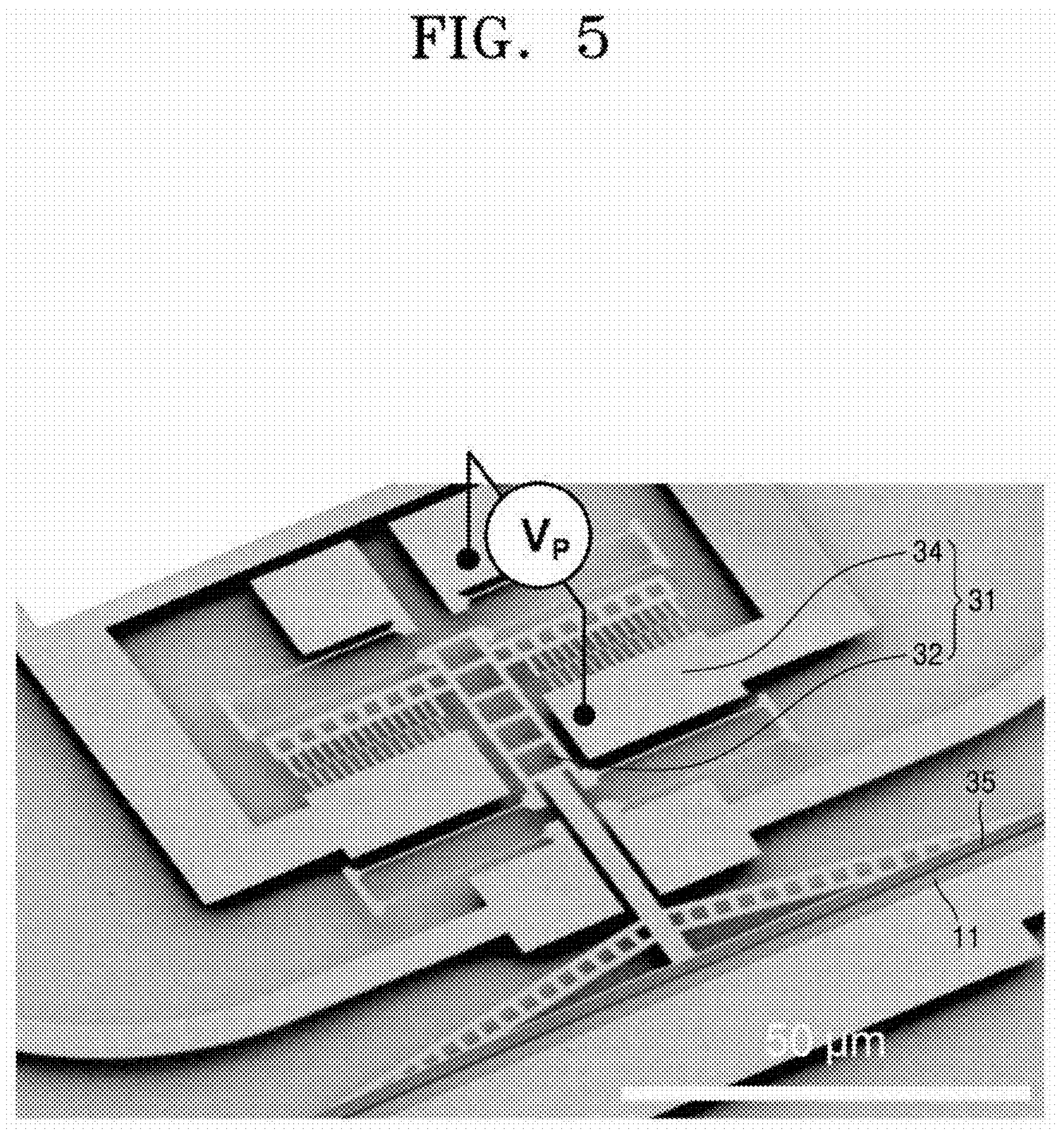
FIG. 5 is an enlarged view of a second actuator of FIG. 2.
Figure 6:
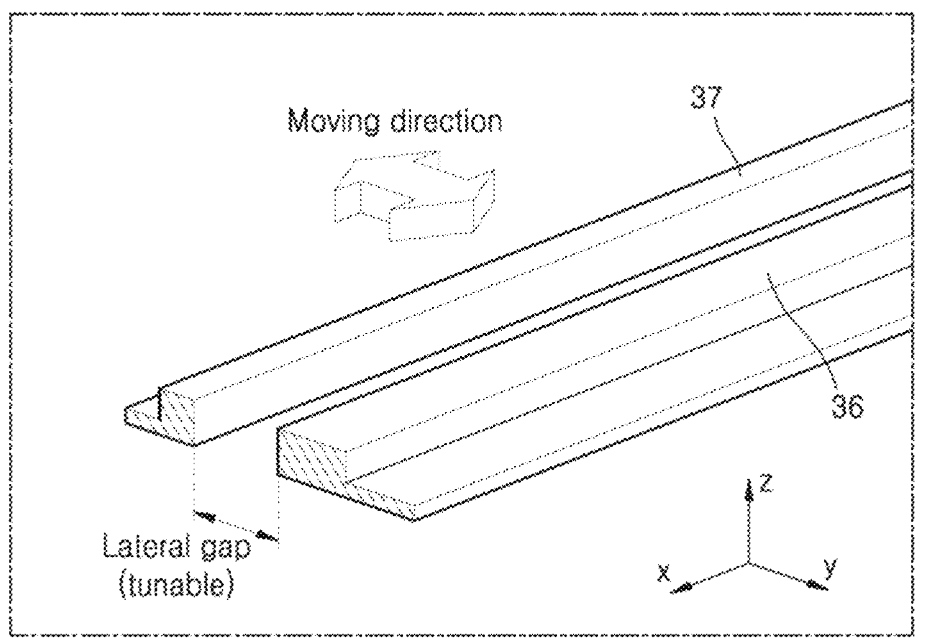
FIG. 6 illustrates a movement of a movable waveguide in a horizontal direction by driving of a second actuator in a photonic circuit according to an embodiment.

FIG. 5 is an enlarged view of the second actuator 31 of FIG. 2. FIG. 6 illustrates a movement of a movable waveguide 37 in the horizontal direction by the driving of the second actuator 31 in the photonic circuit 10 according to an embodiment.

Referring to FIGS. 2, 5 and 6, the second actuator 31 may be provided to move the movable waveguide 37, for example, the perturbation waveguide 35, in the second moving direction, for example, in the horizontal direction. In a case in which the perturbation waveguide 35 is moved by the second actuator 31, the first waveguide 11 may correspond to a fixed waveguide 36. As another example, the first waveguide 11 may be provided to be movable by the second actuator 31, and in this case, the first waveguide 11 may correspond to the movable waveguide 37 and the perturbation waveguide 35 may correspond to the fixed waveguide 36. Although an example is herein described in which the second actuator 31 is provided to move the perturbation waveguide 35 and the second moving direction in which the perturbation waveguide 35 is moved is the horizontal direction, the embodiment is not limited thereto.

As exemplarily illustrated in FIGS. 2 and 5, the second actuator 31 may be, for example, a MEMS-based actuator. As exemplarily illustrated in FIG. 5, the second actuator 31 may include a second fixed part 34 and a second movable part 32 provided to be movable with respect to the second fixed part 34 to move the perturbation waveguide 35. The second movable part 32 may be coupled to the perturbation waveguide 35. The second actuator 31 may move the second movable part 32 with respect to the second fixed part 34 by a driving voltage $V_p$ applied from the control unit 50, to move the perturbation waveguide 35 coupled to the second movable part 32 in the second moving direction, i.e., in the horizontal direction.

As exemplarily illustrated in FIG. 6, the lateral gap between the perturbation waveguide 35 and the first waveguide 11 is tunable by moving the movable waveguide 37, for example, the perturbation waveguide 35, in the horizontal direction by the driving voltage $V_p$ applied from the control unit 50 to the second actuator 31, accordingly, the effective refractive index of the optical mode of a transmission waveguide, for example, the first waveguide 11, may be changed, and thus, the phase of light traveling through the first waveguide 11 may be changed.

According to the programmable photonic circuit 10 according to an embodiment, the control unit 50 may be provided to apply the driving voltage $V_p$ to the second fixed part 34 of the second actuator 31. The second movable part 32 of the second actuator 31 may be electrically grounded. The second actuator 31 may be provided to be driven in an electrostatic manner. Accordingly, the second actuator 31 consumes power only during operation, and the power consumption during operation may also be significantly low.

Meanwhile, as exemplarily illustrated in FIG. 6, the cross-sectional areas of the fixed waveguide 36 and the movable waveguide 37, for example, the cross-sectional areas of the first waveguide 11 and the perturbation waveguide 35, may be different from each other. For example, the cross-sectional area of the perturbation waveguide 35 may be less than that of the first waveguide 11. As another example, the cross-sectional area of the perturbation waveguide 35 may be greater than that of the first waveguide 11. As yet another example, the cross-sectional areas of the first waveguide 11 and the perturbation waveguide 35 may be equal to each other.

Figure 7:
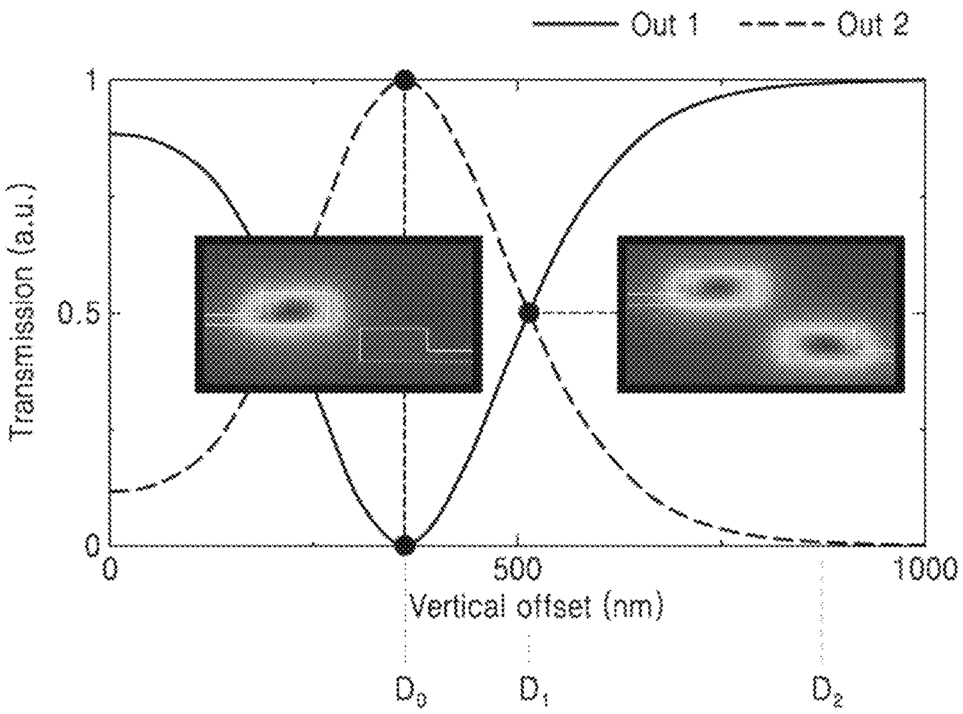
FIG. 7 is a diagram for describing a change in optical coupling efficiency according to driving of a tunable optical coupler of a programmable photonic circuit according to an embodiment.

FIG. 7 is a diagram for describing a change in optical coupling efficiency according to driving of the tunable optical coupler 20 of the programmable photonic circuit 10 according to the embodiment described above with reference to FIGS. 1 to 4. In FIG. 7, the horizontal axis represents the size (in nm) of the vertical offset between the first waveguide 11 and the second waveguide 13 in the first section 15, and the vertical axis represents a change (in arbitrary units (a.u.)) in the optical transmission of the first waveguide 11 and the second waveguide 13 according to the vertical offset.

As shown in FIG. 7, the tunable optical coupler 20 may adjust optical coupling between the first waveguide 11 and the second waveguide 13 by adjusting the size of the vertical offset between the first waveguide 11 and the second waveguide 13 according to the driving voltage $V_c$ applied from the control unit 50 to the first actuator 21.

For example, when light is input to the first waveguide 11, the amount of light In1 transferred to the second waveguide 13 is changed according to the size of the vertical offset.

When the size of the vertical offset corresponds to a reference separation distance $D_0$, for example, about 400 nm, the rate of optical coupling from the first waveguide 11 to the second waveguide 13 is the maximum, and when the size of the vertical offset is greater or less than the reference separation distance $D_0$, the rate of optical coupling from the first waveguide 11 to the second waveguide 13 decreases.

As shown in the first image of FIG. 7, when the size of the vertical offset corresponds to the reference separation distance $D_0$, most of the light propagating to the first waveguide 11 is coupled to the second waveguide 13, and most of the light having passed through the tunable optical coupler 20 is transmitted through the second waveguide 13. As the size of the vertical offset becomes greater or less than the reference separation distance $D_0$, the optical coupling rate to the second waveguide 13 decreases. When the size of the vertical offset is a first separation distance $D_1$, for example, about 500 nm, corresponding to an optical coupling rate of about 0.5, as shown in the second image, approximately half of the light input to the first waveguide 11 is coupled to the second waveguide 13, after passing through the tunable optical coupler 20, approximately half of the input light is propagated to each of the first waveguide 11 and the second waveguide 13. When the size of the vertical offset is greater than, for example, the first separation distance $D_1$, the rate of optical coupling from the first waveguide 11 to the second waveguide 13 further decreases, and when the size of the vertical offset reaches a second separation distance $D_2$, the optical coupling to the second waveguide 13 is hardly made, and the input light is propagated through the first waveguide 11.

As shown in FIG. 7, when the size of the vertical offset corresponds to the reference separation distance $D_0$, for example, the optical coupling from the first waveguide 11 to the second waveguide 13 may be maximized, and when the size of the vertical offset is greater or less than the reference separation distance $D_0$, only part of light is coupled to the second waveguide 13, or when the size of the vertical offset is greater than a threshold distance, optical coupling is not made. The vertical offset may be controlled, for example, in the range of about 0 nm to about 500 nm or about 0 nm to about 1000 nm. FIG. 7 shows an example in which the reference separation distance $D_0$ for the vertical offset between the first waveguide 11 and the second waveguide 13 at which the optical coupling is maximized is about 400 nm, but the reference separation distance $D_0$ is not limited thereto and may vary depending on design conditions of the tunable optical coupler 20.

In FIG. 7, Out1 and Out2 denote light passing through the photonic circuit 10 and transmitted to the first waveguide 11 and the second waveguide 13, respectively. When the vertical offset corresponds to the reference separation distance $D_0$, the light Out2 transmitted through the second waveguide 13 may be maximum, and the light Out1 transmitted through the first waveguide 11 may be zero. For example, when light is input to the first waveguide 11, by applying a driving signal to the first actuator 21 to adjust the vertical offset between the first waveguide 11 and the second waveguide 13, for example, at least part of the light transmitted through the first waveguide 11 may be coupled to the second waveguide 13 and then transmitted through the second waveguide 13.

For example, when light is input to the first waveguide 11, by applying a driving signal to the first actuator 21 to adjust the vertical offset between the first waveguide 11 and the second waveguide 13, the amount of light coupled to the second waveguide 13 may be adjusted, and accordingly, the ratio between the amounts of light transmitted to the first waveguide 11 and the second waveguide 13 may be adjusted. As such, the tunable optical coupler 20 may adjust optical coupling from the second waveguide 13 to the first waveguide 11 or optical coupling from the first waveguide 11 to the second waveguide 13, by adjusting the vertical offset between the first waveguide 11 and the second waveguide 13 according to a driving signal applied to the first actuator 21.

Here, when the vertical offset corresponds to the reference separation distance $D_0$, the first actuator 21 may be in, for example, an off state or a state in which a reference driving signal, for example, a reference driving voltage is applied.

For example, when the first actuator 21 is in the off state or the state in which the reference driving signal is applied, most of the light input to the first waveguide 11 is coupled to and transmitted through the second waveguide 13, and no light is transmitted through the first waveguide 11. As the size of the vertical offset gradually increases or decreases from the reference separation distance $D_0$ according to the driving signal applied from the control unit 50 to the first actuator 21, the rate of optical coupling from the first waveguide 11 to the second waveguide 13 may be adjusted such that the amount of light transmitted through the second waveguide 13 gradually may decrease, and the amount of light transmitted through the first waveguide 11 gradually may increase. When the vertical offset size is, for example, approximately 500 nm, the amount of light transmitted through the first waveguide 11 and the amount of light transmitted through the second waveguide 13 may be similar to each other. When the vertical offset is greater than 500 nm, the optical coupling rate between the first waveguide 11 and the second waveguide 13 decreases, and most of the light is transmitted through the first waveguide 11. Although an example has been described in which the light is input to the first waveguide 11, but this is only an example, and the embodiment is not limited thereto. Light may be input to the second waveguide 13, and in this case, the optical coupling rates of the first waveguide 11 and the second waveguide 13 may also be adjusted according to the size of the vertical offset, and the amounts of light transmitted through the first waveguide 11 and the second waveguide 13 may be changed. In addition, light may be input to each of the first waveguide 11 and the second waveguide 13, and in this case, the optical coupling rates of the first waveguide 11 and the second waveguide 13 may also be adjusted according to the size of the vertical offset, and accordingly, the amounts of light transmitted through the first waveguide 11 and the second waveguide 13 may be changed.

For example, when light is input to the second waveguide 13, by applying a driving signal to the first actuator 21 to adjust the vertical offset between the first waveguide 11 and the second waveguide 13, for example, at least part of the light transmitted through the second waveguide 13 may be coupled to the first waveguide 11 and then transmitted through the first waveguide 11. In addition, even when light is input to each of the first and second waveguides 11 and 13, by applying a driving signal to the first actuator 21 to adjust the vertical offset between the first waveguide 11 and the second waveguide 13, for example, optical coupling from the first waveguide 11 to the second waveguide 13 and optical coupling from the second waveguide 13 to the first waveguide 11 may be adjusted, and accordingly, the amounts of light transmitted through the first waveguide 11 and the second waveguide 13 may be adjusted.

Figure 8:
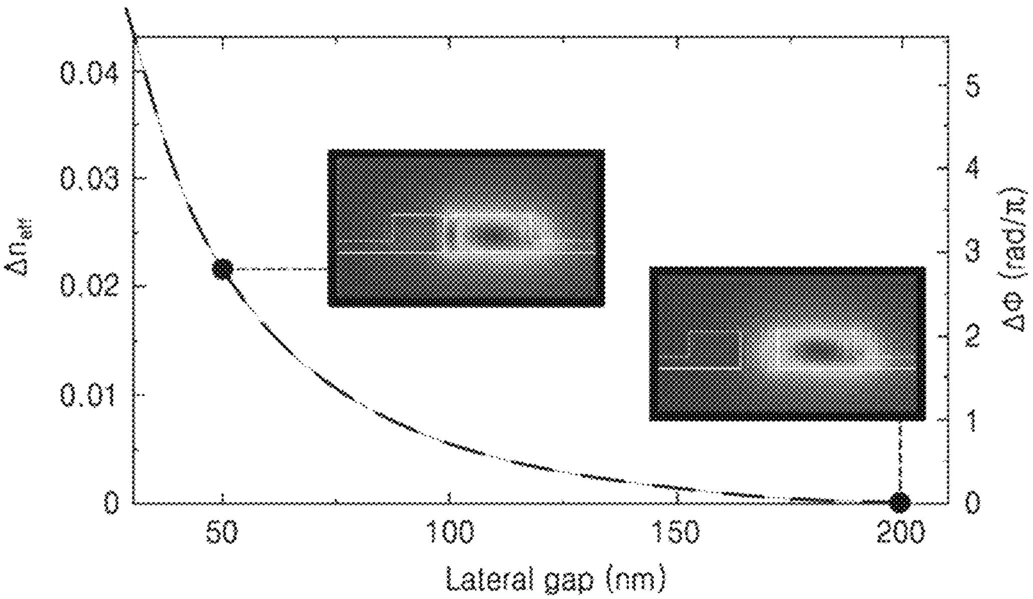
FIG. 8 is a diagram for describing a phase change according to driving of an optical phase shifter of a programmable photonic circuit according to an embodiment.

FIG. 8 is a diagram for describing a phase change according to driving of the optical phase shifter 30 of the programmable photonic circuit 10 according to the embodiment described above with reference to FIGS. 1, 2, 5, and 6, and shows a result of simulating an effective refractive index change $\Delta n_{eff}$ and a phase shift of an optical mode according to the lateral gap between a fixed waveguide and a movable waveguide in an optical phase shifter having a length of about 100 μm. In FIG. 8, the horizontal axis represents the lateral gap (in nm) between the transmission waveguide and the perturbation waveguide 35, the vertical axis on the left represents the effective refractive index change $\Delta n_{eff}$ of the optical mode of the transmission waveguide according to the lateral gap, and the vertical axis on the right represents the phase change (in rad/π) according to the lateral gap.

Referring to FIG. 8, the optical phase shifter 30 may adjust the lateral gap between the perturbation waveguide 35 and the transmission waveguide arranged adjacent thereto to change the effective refractive index of the optical mode of the transmission waveguide adjacent to the perturbation waveguide 35 according to a driving signal applied from the control unit 50 to the second actuator 31, for example, the driving voltage $V_p$, and accordingly, change the phase. The transmission waveguide may be the first waveguide 11 or the second waveguide 13. FIGS. 1 and 2 illustrate an example in which the perturbation waveguide 35 is arranged adjacent to the first waveguide 11, the transmission waveguide is the first waveguide 11, and thus, the optical phase shifter 30 is provided to change the phase by changing the effective refractive index of the optical mode traveling through the first waveguide 11. As another example, the transmission waveguide may be the second waveguide 13, and in this case, the perturbation waveguide 35 may be arranged adjacent to the second waveguide 13, and thus, the optical phase shifter 30 may be provided to change the phase by changing the effective refractive index of an optical mode traveling through the second waveguide 13. In addition, in the programmable photonic circuit 10 according to an embodiment, the perturbation waveguide 35 may be arranged adjacent to each of the first waveguide 11 and the second waveguide 13, and thus, the optical phase shifter 30 may be provided to change the effective refractive indices of optical modes of the first waveguide 11 and the second waveguide 13. In addition, in the programmable photonic circuit 10 according to an embodiment, the optical phase shifter 30 may be arranged to change the phase of light having passed through the optical coupler 20.

As such, one programmable photonic circuit 10 according to an embodiment includes at least one tunable optical coupler 20 and at least one optical phase shifter 30, and may be provided in various ways. FIG. 8 shows the effective refractive index change $\Delta n_{eff}$ and a resulting phase change $\Delta\varphi$ (rad/$\pi$) in the optical phase shifter 30, when adjusting the lateral gap between the perturbation waveguide 35 and the transmission waveguide, for example, the first or second waveguides 11 or 13, from about 0 nm to about 200 nm. When the lateral gap is minimized, the effective refractive index change amount of the optical mode of the transmission waveguide and the resulting phase change amount may be maximized, and as the lateral gap increases, the effective refractive index change amount of the optical mode of the transmission waveguide and the resulting phase change amount gradually may decrease. Although FIG. 8 shows that the minimum value of the lateral gap is approximately 0 nm, the embodiment is not limited thereto, and the minimum value of the lateral gap may be greater than 0 nm.

When the lateral gap between the perturbation waveguide 35 and the transmission waveguide is adjusted by driving the second actuator 31, the phase change amount of light transmitted through the transmission waveguide, for example, the first and/or second waveguides 11 and/or 13 may vary depending on the effective refractive index change of the optical mode.

Meanwhile, assuming that, as exemplarily illustrated in FIGS. 1 and 2, the programmable photonic circuit 10 according to an embodiment includes a tunable optical gate capable of 2×2 unitary transformation, that a phase change of the optical phase shifter 30 provided on the transmission path of the first waveguide 11 is $\Delta\varphi$, and that the optical coupling efficiency between the first waveguide 11 and the second waveguide 13 in the tunable optical coupler 20 is $\kappa$, the optical phase shifter 30 and the tunable optical coupler 20 may be expressed as matrices as in Equations 1 and 2. In addition, when the optical signal $a_1$ and the optical signal $a_2$ are input to the first waveguide 11 and the second waveguide 13, respectively, the optical signals $b_1$ and $b_2$ transmitted respectively through the first waveguide 11 and the second waveguide 13 via the tunable optical gate may be expressed as Equation 3.

$$\begin{bmatrix} e^{-i\Delta\phi} & 0 \\ 0 & 1 \end{bmatrix} \quad \text{[Equation 1]}$$

$$\begin{bmatrix} \sqrt{1-\kappa} & i\sqrt{\kappa} \\ i\sqrt{\kappa} & \sqrt{1-\kappa} \end{bmatrix} \quad \text{[Equation 2]}$$

$$\begin{bmatrix} b_1 \\ b_2 \end{bmatrix} = \begin{bmatrix} \sqrt{1-\kappa} & i\sqrt{\kappa} \\ i\sqrt{\kappa} & \sqrt{1-\kappa} \end{bmatrix} \begin{bmatrix} e^{-i\Delta\phi} & 0 \\ 0 & 1 \end{bmatrix} \begin{bmatrix} a_1 \\ a_2 \end{bmatrix} \quad \text{[Equation 3]}$$

As may be seen from Equation 3, when the optical signals $a_1$ and $a_2$ are input (In1 and In2) to the first waveguide 11 and the second waveguide 13, respectively, the optical signals $b_1$ and $b_2$ output (Out1, Out2) from the first waveguide 11 and the second waveguide 13, respectively, may be controlled by applying the driving voltage $V_p$ from the control unit 50 to the first actuator 21 to control the phase change $\Delta\varphi$ by the optical phase shifter 30, and by applying the driving voltage $V_c$ from the control unit 50 to the second actuator 31 to control the optical coupling efficiency $\kappa$ of the tunable optical coupler 20.

Figure 9A:
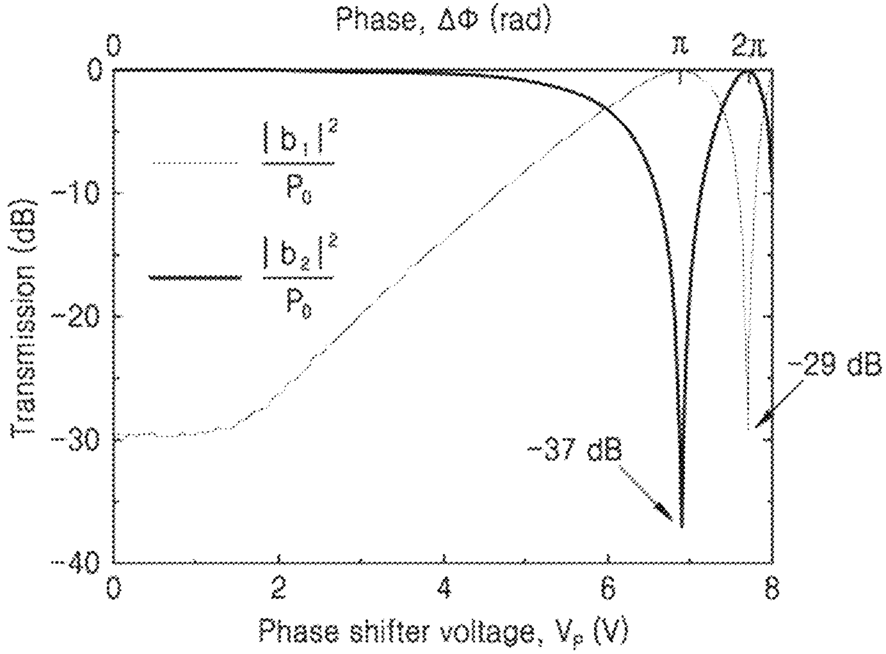
FIGS. 9A and 9B are graphs showing, on a logarithmic scale and a linear scale, a phase change $\Delta\varphi$ according to a driving signal applied to an optical phase shifter and resulting changes in the transmission rate of optical signals $b_1$ and $b_2$ output respectively from a first waveguide and a second waveguide, in a tunable optical gate represented by Equation 3 to which a programmable photonic circuit according to an embodiment is applied.
Figure 9B:
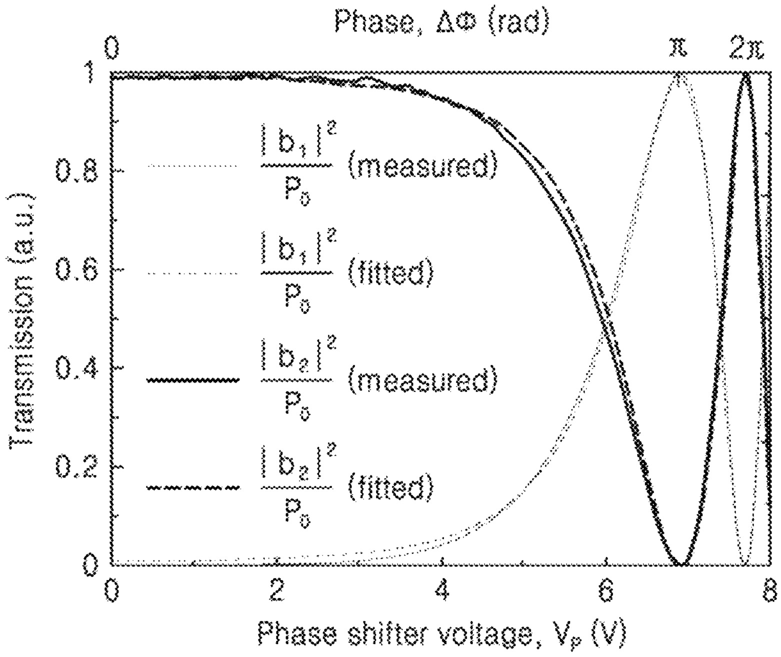

FIGS. 9A and 9B are graphs showing, on a logarithmic scale and a linear scale, the phase change $\Delta\varphi$ according to a driving signal applied to the optical phase shifter 30 and resulting changes in the transmission rate of the optical signals $b_1$ and $b_2$ output respectively from the first waveguide 11 and the second waveguide 13, in a tunable optical gate represented by Equation 3 to which the programmable photonic circuit 10 according to the embodiment described above with reference to FIGS. 1 to 6 is applied. The graphs of FIGS. 9A and 9B are obtained for the condition that optical signals $a_1$ and $a_2$ are input to the first waveguide 11 and the second waveguide 13, respectively, with the same optical power $|a\mathbf{1}|^2=|a\mathbf{2}|^2=0.5\ P_0$, and the phase difference is close to $\pi/2$.

Referring to FIGS. 9A and 9B, when the phase change $\Delta\varphi$ by the optical phase shifter 30 is approximately $\pi$, the optical signal $b_1$ output from the first waveguide 11 may be the maximum, the optical signal $b_1$ output from the second waveguide 13 may be the minimum, for example, about −37 dB, and when the phase change $\Delta\varphi$ by the optical phase shifter 30 is approximately $2\pi$, the optical signal $b_1$ output from the first waveguide 11 may be the minimum, for example, about −29 dB, and the optical signal $b_2$ output from the second waveguide 13 may be the maximum.

As may be seen from FIGS. 9A and 9B, by adjusting the phase change $\Delta\varphi$ by the optical phase shifter 30, the optical coupling between the first waveguide 11 and the second waveguide 13 may be adjusted, and the optical signals $b_1$ and $b_2$ output from the first waveguide 11 and the second waveguide 13, respectively, may be adjusted.

Figure 10A:
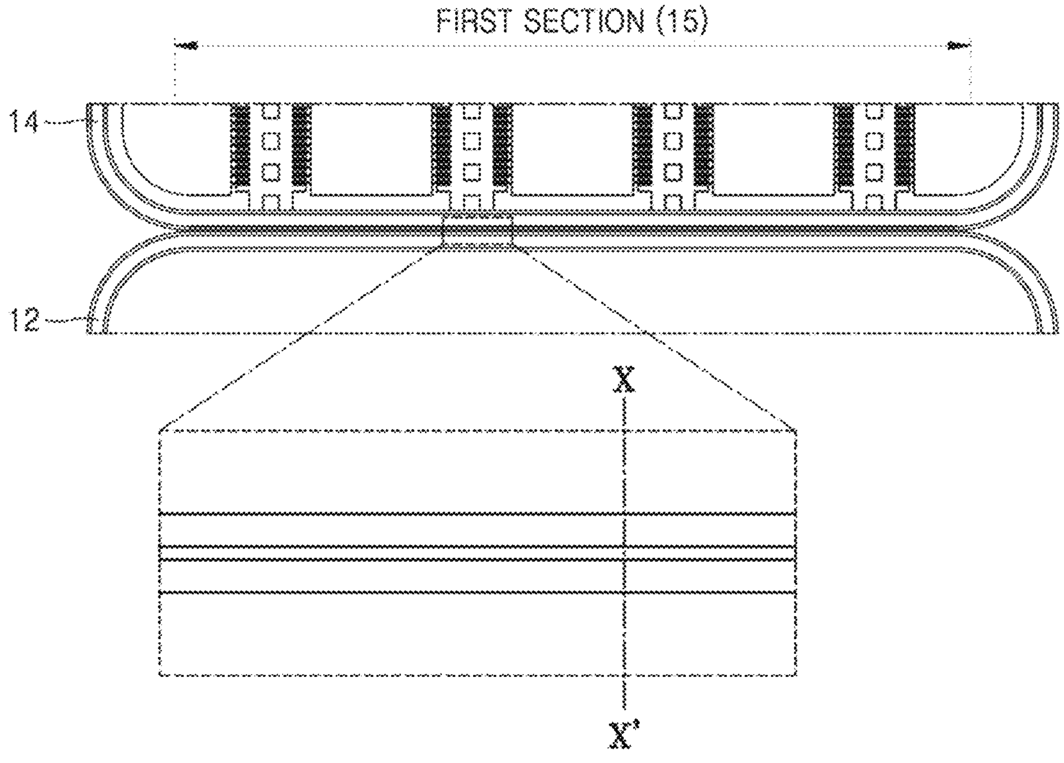
FIGS. 10A and 10B exemplarily illustrate a design example of a tunable optical coupler.
Figure 10B:
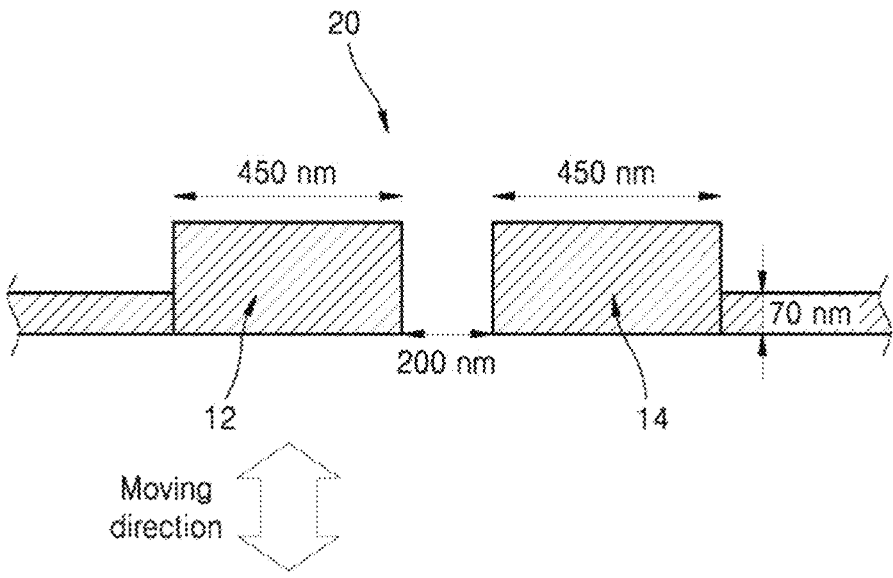
Figure 10C:
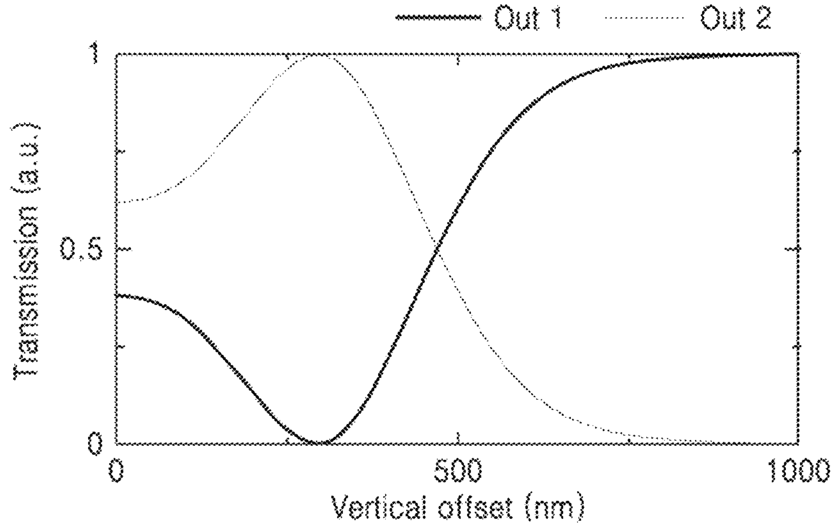
FIG. 10C is a graph showing a change in optical coupling efficiency according to driving of a tunable optical coupler to which the design example of FIGS. 10A and 10B is applied.

FIGS. 10A and 10B illustrate a design example of the tunable optical coupler 20, wherein FIG. 10A is a plan view of the first section 15 in which the tunable optical coupler 20 is formed, and FIG. 10B is a schematic cross-sectional view taken along line X-X' of FIG. 10A. FIG. 10C is a graph showing a change in optical coupling efficiency according to driving of the tunable optical coupler 20 to which the design example of FIGS. 10A and 10B is applied. In FIG. 10C, the horizontal axis represents the size (in nm) of the vertical offset between the first waveguide 11 and the second waveguide 13, and the vertical axis represents a change (in arbitrary units (a.u.)) in the optical transmission of the fixed waveguide 12 and the movable waveguide 14 according to the vertical offset. The fixed waveguide 12 may be any one of the first waveguide 11 and the second waveguide 13, and the movable waveguide 14 may be the other one. In FIG. 10C, Out1 and Out2 denote light passing through the photonic circuit 10 and transmitted to the first waveguide 11 and the second waveguide 13, respectively.

Referring to FIGS. 10A and 10B, the first section 15 of the tunable optical coupler 20 may be provided to correspond to a length of, for example, several μm to hundreds of μm, for example, 120 μm to 150 μm. In the first section 15, first portions of the fixed waveguide 12 and the movable waveguide 14 through which light is transmitted may be formed to be thicker than remaining second portions, and the first portions may be formed to have a width and a gap in nanometers. For example, the first portions may be formed with a width of about 450 nm and a gap therebetween of about 200 nm. The second portions of the fixed waveguide 12 and the movable waveguide 14 may be formed to be thinner than the first portions. The second portions may be formed to have a thickness of, for example, about 70 nm.

The tunable optical coupler 20 may adjust the size of the vertical offset between the fixed waveguide 12 and the movable waveguide 14 by moving the movable waveguide 14 in the first moving direction (e.g., the vertical direction) according to a driving signal applied from the control unit 50 to the first actuator 21, for example, the driving voltage $V_c$, and accordingly, the optical coupling between the fixed waveguide 12 and the movable waveguide 14 may be adjusted.

That is, the size of the vertical offset between the first waveguide 11 and the second waveguide 13 may be adjusted, and accordingly, the optical coupling between the first waveguide 11 and the second waveguide 13 may be adjusted.

For example, when light is input to the first waveguide 11, the amount of light Int transferred to the second waveguide 13 may be changed according to the size of the vertical offset.

As shown in FIG. 10C, when the size of the vertical offset corresponds to the reference separation distance $D_0$, for example, about 400 nm, the rate of optical coupling from the first waveguide 11 to the second waveguide 13 may be the maximum, and when the size of the vertical offset is greater or less than the reference separation distance $D_0$, the rate of optical coupling from the first waveguide 11 to the second waveguide 13 may decrease. When the size of the vertical offset, i.e., the separation distance, is, for example, about 500 nm, the optical coupling rate is about 0.5, approximately half of light input to the first waveguide 11 is coupled to the second waveguide 13, and when the size of the vertical offset is greater than about 500 nm, optical coupling from the first waveguide 11 to the second waveguide 13 further decreases. When the size of the vertical offset corresponds to the reference separation distance $D_0$, the first actuator 21 may be in, for example, an off state or a state in which a reference driving signal, for example, a reference driving voltage is applied.

In a case in which the tunable optical coupler 20 has the dimensions of the design example of FIGS. 10A and 10B, as may be seen from FIG. 10C, when the size of the vertical offset is about 400 nm, for example, optical coupling from the first waveguide 11 to the second waveguide 13 may be maximized, and when the size of the vertical offset is greater or less than 400 nm, only part of the light is coupled to the second waveguide 13, and when the size of the vertical offset is greater than a threshold distance is exceeded, no optical coupling is made. In a case in which the design example of FIGS. 10A and 10B is applied, a vertical offset for adjusting optical coupling may be controlled in a range of, for example, about 0 nm to about 500 nm or about 0 nm to about 1000 nm. The size of the vertical offset between the first waveguide 11 and the second waveguide 13 in which the optical coupling is maximized may vary depending on design conditions of the tunable optical coupler 20.

Figure 11A:
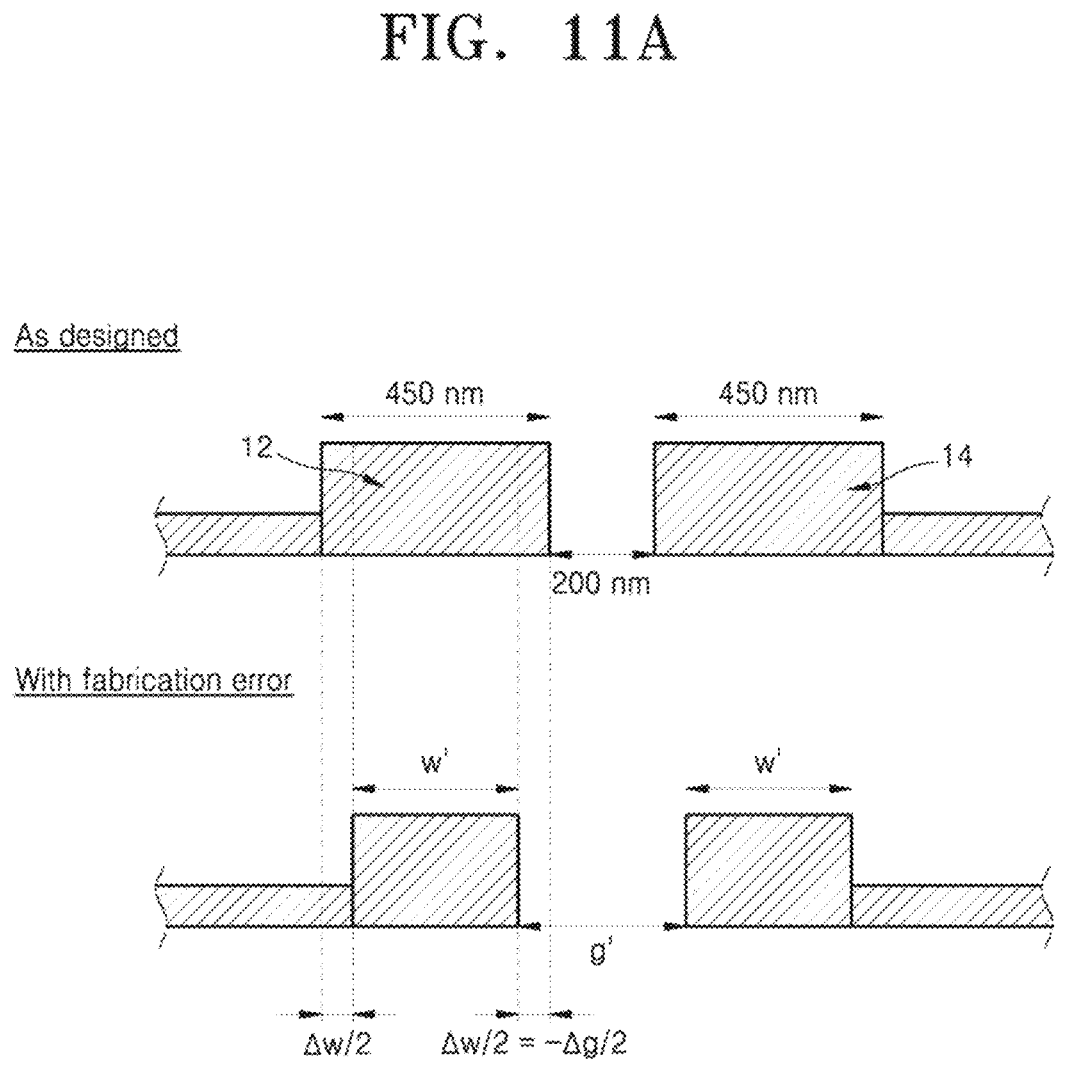
Figure 11B:
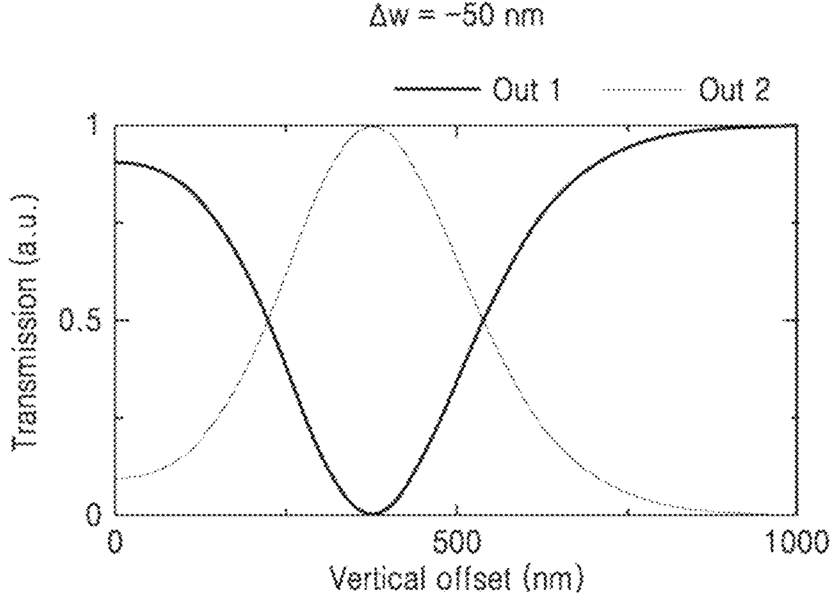
FIGS. 11B and 11C are graphs showing changes in optical coupling rate in a tunable optical coupler to which the manufacturing error of FIG. 11A is applied.
Figure 11C:
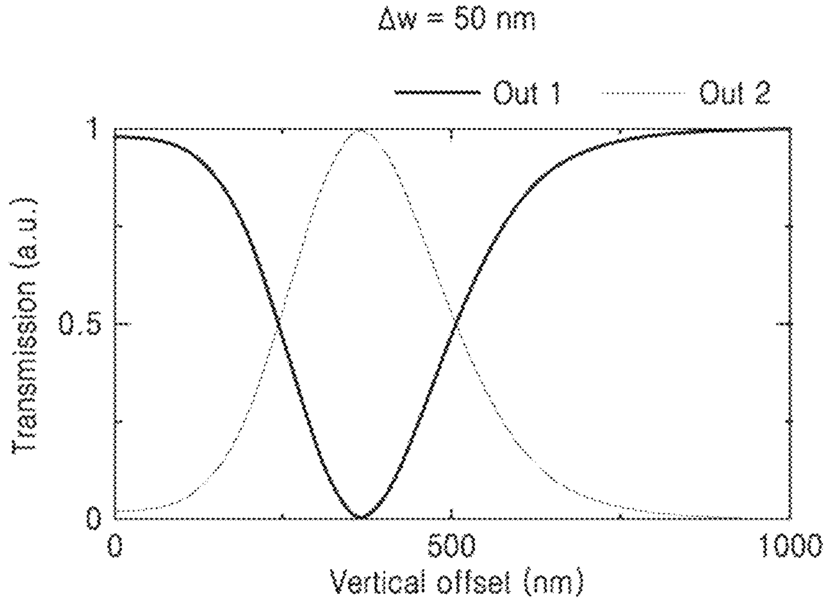

FIG. 11A illustrates an example of a manufacturing error of the tunable optical coupler 20, and FIGS. 11B and 11C are graphs showing changes in optical coupling rate in the tunable optical coupler 20 to which the manufacturing error of FIG. 11A is applied.

For example, as illustrated in FIG. 11A, when the widths of the first portions of the fixed waveguide 12 and the movable waveguide 14, i.e., the first waveguide 11 and the second waveguide 13, are greater or less than design values at each of both sides by $\Delta w/2$, and thus, the overall widths of the first portions decrease or increase by $\Delta w$, the gap between the fixed waveguide 12 and the movable waveguide 14 increases or decreases by $\Delta g$. That is, because $\Delta w/2=-\Delta g/2$, the gap between the fixed waveguide 12 and the movable waveguide 14 increases or decreases as much as decreases or increases in the widths of the first portions.

In FIG. 11A, w' denotes the widths of the first portions of the fixed waveguide 12 and the movable waveguide 14 to which the manufacturing error is applied, and g' denotes the gap between the first portions of the fixed waveguide 12 and the movable waveguide 14 to which the manufacturing error is applied.

FIG. 11B shows an optical coupling rate change when a manufacturing error $\Delta w=-50$ nm, and FIG. 11C shows an optical coupling rate change when the manufacturing error $\Delta w=50$ nm.

For example, when light is input to the first waveguide 11, the amount of the light In1 transferred to the second waveguide 13 may be changed according to the size of the vertical offset.

As may be seen by comparing FIG. 10C with FIGS. 11B and 11C, even in a case in which a manufacturing error of the fixed waveguide 12 and the movable waveguide 14, i.e., the first waveguide 11 and the second waveguide 13, occurs to some extent, the optical coupling of the first waveguide 11 and the second waveguide 13 is changed according to the vertical offset.

Figure 12A:
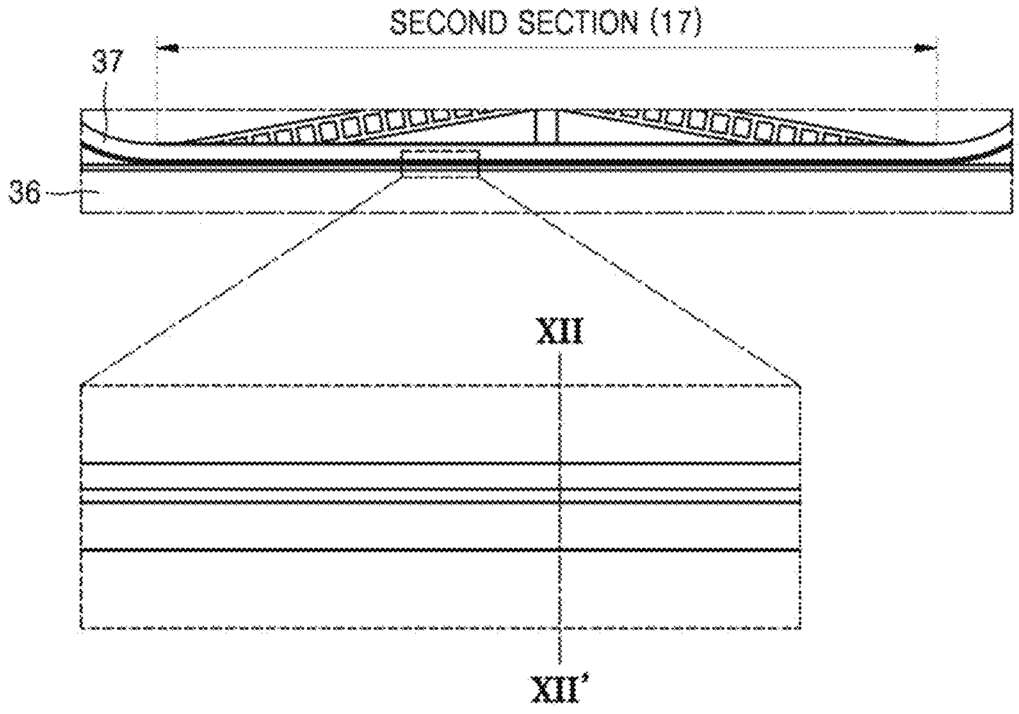
FIGS. 12A and 12B exemplarily illustrate a design example of an optical phase shifter.
Figure 12B:
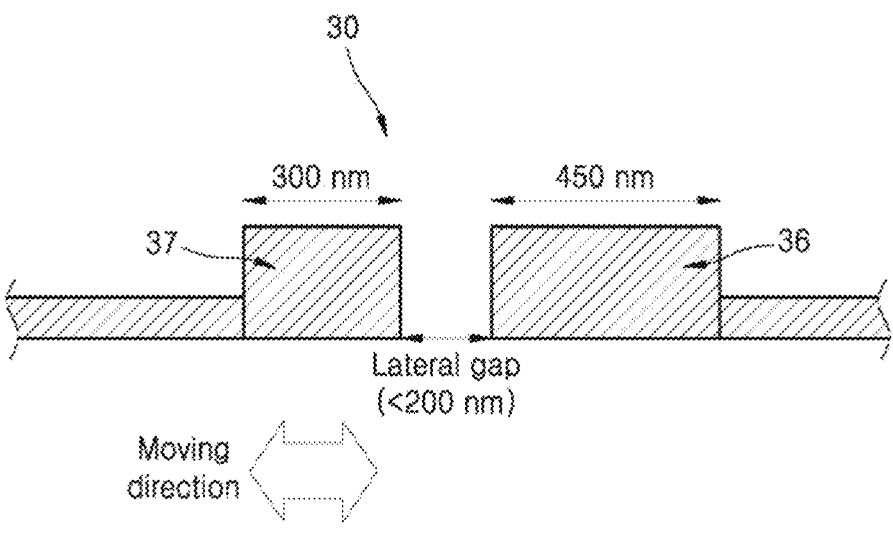

FIGS. 12A and 12B exemplarily illustrate a design example of the optical phase shifter 30, wherein FIG. 12A is a plan view of the second section 17 in which the optical phase shifter 30 is formed, and FIG. 12B is a schematic cross-sectional view taken along line XII-XII' of FIG. 12A. Referring to FIGS. 12A and 12B, the second section 17 of the optical phase shifter 30 may be provided to correspond to a length of, for example, about 100 μm. In the second section 17, first portions of the fixed waveguide 36 and the movable waveguide 37 through which light is transmitted may be formed to be thicker than remaining second portions, and the first portions may be formed to have a gap of 200 nm. The first portion of the movable waveguide 37 may be formed to have a width of, for example, about 300 nm, and the first portion of the fixed waveguide 36 may be formed to have a width of, for example, 450 nm. Any one of the movable waveguide 37 and the fixed waveguide 36 may be the perturbation waveguide 35 and the other one may be a transmission waveguide, and the transmission waveguide may be any one of the first waveguide 11 or the second waveguide 13.

The optical phase shifter 30 may adjust the lateral gap between the perturbation waveguide 35 and the transmission waveguide by moving the movable waveguide 37, for example, the perturbation waveguide 35, in the second moving direction (e.g., the horizontal direction) according to the driving voltage $V_p$ applied from the control unit 50 to the second actuator 31, and accordingly, change the effective refractive index of the optical mode of the transmission waveguide to shift the phase. The effective refractive index of the optical mode varies depending on the lateral gap, and accordingly, the amount of phase shift may also vary. In addition, because the effective refractive index varies depending on the wavelength, the amount of phase shift may vary depending on the wavelength.

Figure 13:
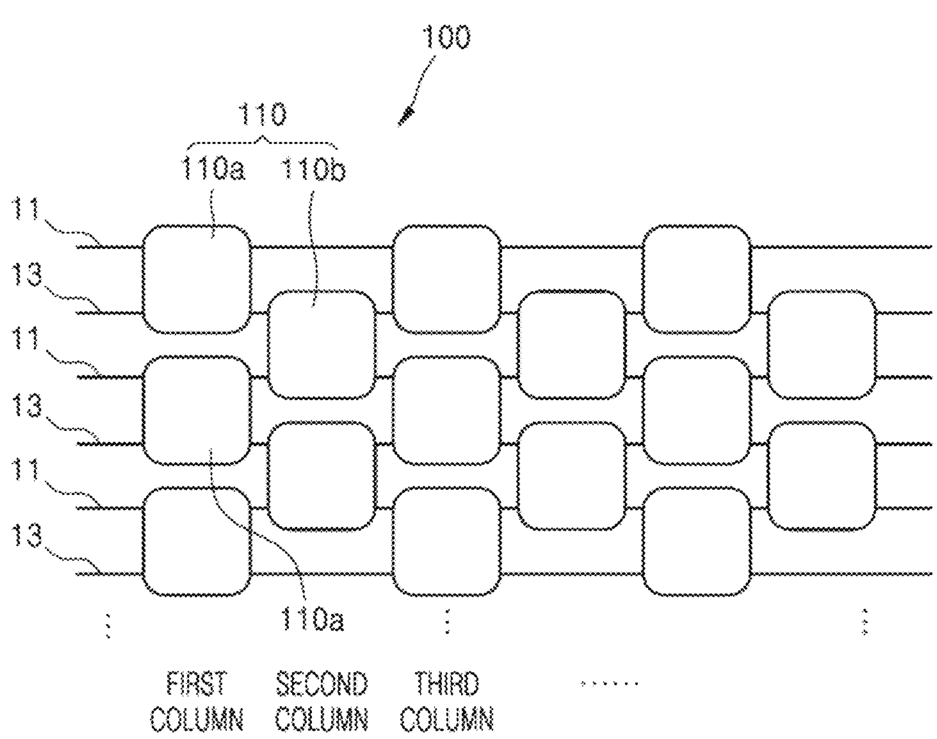
FIG. 13 schematically illustrates a programmable photonic circuit according to another embodiment.

FIG. 13 schematically illustrates a programmable photonic circuit 100 according to another embodiment, and corresponds to arrangement of several optical gates consisting of the programmable photonic circuits 10 of FIG. 1 to form an N×N feed-forward programmable photonic integrated circuit.

Referring to FIG. 13, the programmable photonic circuit 100 according to another embodiment includes an array of optical gates 110 to form an N×N feed-forward photonic circuit, and each of the optical gates 110 may have a tunable optical gate structure including one phase shifter 30 and one tunable optical coupler 20 described above with reference to FIGS. 1 to 6 and capable of 2×2 unitary transformation. That is, each of the optical gates 110 may correspond to the programmable photonic circuit 10 described above with reference to FIGS. 1 to 6.

For example, pairs of the first waveguide 11 and the second waveguide 13 may be repeatedly arranged, an optical gate 110*a* may be configured for each pair of the first waveguide 11 and the second waveguide 13 in the first column of the array of the optical gates 110, and an optical gate 110*b* may be configured for the second waveguide 13 of the previous pair and the first waveguide 11 of the next pair, in the second column adjacent to the first column. In the third column adjacent to the second column, the optical gate 110*a* may be configured for each pair of the first waveguide 11 and the second waveguide 13. By cascading and connecting several optical gates 110 to each other in this manner, the feed-forward photonic circuit 100 capable of performing arbitrary N×N matrix multiplication may be configured. Here, N may be a natural number of 3 or greater.

Figure 14:
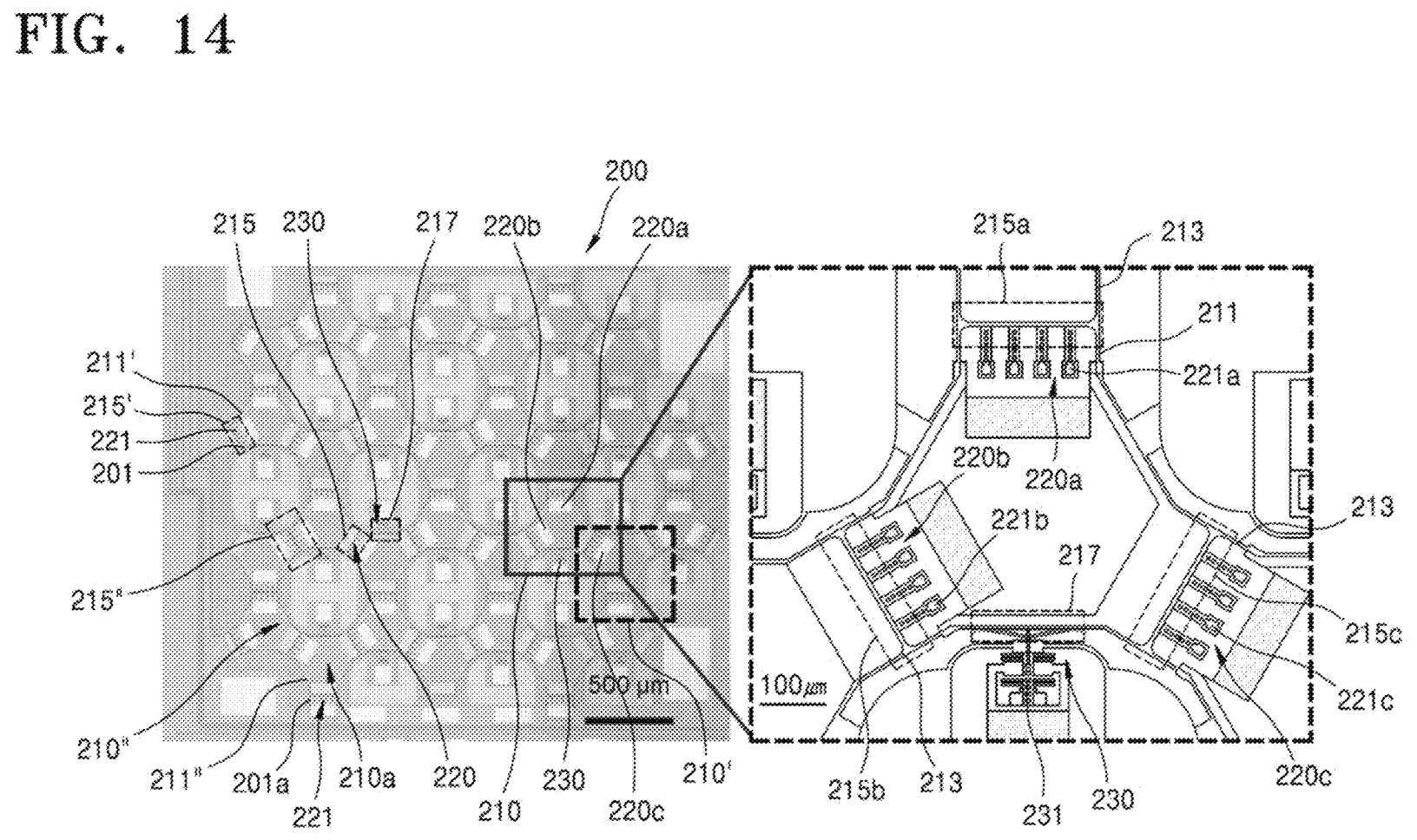
Figure 15:
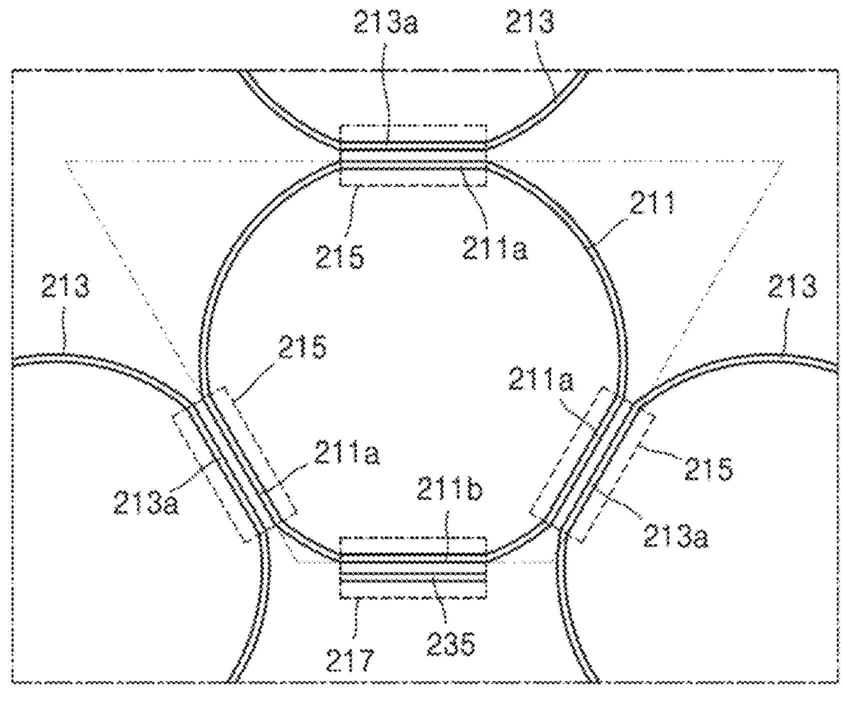
FIG. 15 shows one simplified unit cell of the photonic circuit of FIG. 14.

FIG. 14 schematically illustrates a programmable photonic circuit 200 according to an embodiment, and shows an implementation example of an integrated recirculating programmable photonic circuit. FIG. 14 shows an example in which a unit cell has a size of approximately 500 μm, but the embodiment is not limited thereto, and the size of the unit cell may vary depending on design conditions. In addition, FIG. 14 shows a recirculating programmable photonic integrated circuit including 28 optical phase shifters and 45 tunable optical couplers, but the embodiment is not limited thereto, and the numbers of optical phase shifters and tunable optical couplers for application may vary depending on the design of the photonic circuit. FIG. 15 shows one simplified unit cell of the photonic circuit 200 of FIG. 14. The simplified unit cell of FIG. 15 corresponds to the enlarged view of the unit cell on the right side of FIG. 14.

Referring to FIGS. 14 and 15, in the programmable photonic circuit 200 according to an embodiment, unit cells, each of which is a structure in which each waveguide has a closed-ring shape in which light may circulate, are repeatedly arranged on a two-dimensional plane. At least one tunable optical coupler 220 may be provided between the unit cells adjacent to each other such that optical coupling may be made, and at least some unit cells may each have at least one optical phase shifter 230 in the circulation structure. An input/output waveguide 201 for inputting and outputting light may be arranged adjacent to a first section 215' of each of some of ring-shaped waveguides 211' of the unit cells located at edge portions of the photonic circuit 200, and a tunable optical coupler 221 may be provided on the side of the input/output waveguide 201 or in the first section 215' of the ring-shaped waveguide 211' of a unit cell 211' adjacent to the input/output waveguide 201. For example, on the side of an input/output waveguide 201*a*, the tunable optical coupler 221 for optical coupling with a ring-shaped waveguide 211" of an adjacent unit cell 210*a* may be provided. The ring-shaped waveguides 211' and 211" may correspond to a first waveguide 211 or a second waveguide 213.

In the programmable photonic circuit 200 according to an embodiment, the unit cells may include a first unit cell 210 including the first waveguide 211, and a second unit cell 210' including the second waveguide 213, and the first unit cell 210 and the second unit cell 210' may be alternately arranged. When one unit cell is the first unit cell 210, a unit cell adjacent thereto may be the second unit cell 210'. One or more second unit cells 210' may be adjacent to the first unit cell 210. In addition, one or more first unit cells 210 may be adjacent to the second unit cell 210'. When it is unnecessary to distinguish between the first unit cell 210 and the second unit cell 210', the unit cell is commonly denoted by reference number 210, and when necessary, the adjacent unit cell is denoted by 210'.

The first unit cell 210 may include, for example, the first waveguide 211, at least two tunable optical couplers 220, and one optical phase shifter 230. The second unit cell 210' may include, for example, the second waveguide 213, at least one tunable optical coupler 220, and one optical phase shifter 230. The unit cells may further include a third unit cell 210", the third unit cell 210" may include any one of the first waveguide 211 and the second waveguide 213, and at least one tunable optical coupler 220. The third unit cell 210" may correspond to the first unit cell 210 or the second unit cell 210' without the optical phase shifter 230. Hereinafter, the third unit cell 210" is expressed separately from the first unit cell 210 and the second unit cell 210' only when necessary.

The first waveguide 211 may form a closed ring-shaped waveguide, may include two or more first sections 215 for configuring the tunable optical coupler 220, and may further include a second section 217 for configuring the optical phase shifter 230. The second waveguide 213 may form a closed ring-shaped waveguide, may include two or more first sections 215 for configuring the tunable optical coupler 220, and may further include the second section 217 for configuring the optical phase shifter 230.

In the programmable photonic circuit 200 according to an embodiment, the first waveguide 211 and the second waveguide 213, which are ring-shaped waveguides, may be arranged adjacent to each other to face each other in the first section 215, such that at least one tunable optical coupler 220 is formed in the first section 215 in which the first waveguide 211 and the second waveguide 213 face each other, and a recirculating photonic circuit may be configured by repetitive two-dimensional arrays of the ring-shaped first waveguides 211 and the ring-shaped second waveguides 213, arrangement of the tunable optical coupler 220 in the first section 215 of the first waveguide 211 and/or the second waveguide 213, and arrangement of the optical phase shifter 230 in the second section 217 of the first waveguide 211 and/or the second waveguide 213.

As exemplarily illustrated in FIG. 14, the first waveguide 211 and the second waveguide 213 may be formed in the same shape including a plurality of first sections 215 and at least one second section 217. For example, the first waveguide 211 and the second waveguide 213 may be formed in the entirely same shape including three first sections 215 and one second section 217. Here, the expression 'entirely same shape' encompasses 'completely identical', but does not necessarily mean 'completely identical', and may imply a structural difference. Meanwhile, the first waveguide 211 and the second waveguide 213 may have different shapes provided to enable repeated arrangement thereof.

At least one of the first unit cell 210 and the second unit cell 210' may include the tunable optical coupler 220 in the first section 215 in which the first waveguide 211 and the second waveguide 213 are adjacent to each other.

For example, referring to the right enlarged view of FIG. 14, the first unit cell 210 may include tunable optical couplers 220*a* and 220*b* provided respectively in first sections 215*a* and 215*b* of the first waveguide 211 and the second waveguide 213, and the second unit cell 210' may include a tunable optical coupler 220*c* provided in a first section 215*c* of the first waveguide 211 and the second waveguide 213. In addition, each of the first unit cell 210 and the second unit cell 210' may include the tunable optical coupler 220 in a first section in which the first waveguide 211 and the second waveguide 213 are adjacent to each other, for example, in a first section 215".

Referring to FIGS. 14 and 15, the tunable optical couplers 220*a* and 220*b* of the first unit cell 210 may include first actuators 221*a* and 221*b* provided to move the first sections 215*a* and 215*b* of the first waveguide 211, respectively, in the first moving direction, for example, in the vertical direction. The tunable optical coupler 220*c* of the second unit cell 210' may include a first actuator 221*c* provided to move the first section 215*c* of the second waveguide 213 in the first moving direction, for example, in the vertical direction.

As such, in the first section 215 in which the first waveguide 211 and the second waveguide 213 are adjacent to each other, optical coupling between the first waveguide 211 and the second waveguide 213 may be adjusted by moving the first section 215 of any one of the first waveguide 211 and the second waveguide 213 in the first moving direction, for example, in the vertical direction, by driving of the first actuator.

In addition, each of the first unit cell 210 and the second unit cell 210' may include the optical phase shifter 230 in the second section 217 of the first waveguide 211 and the second waveguide 213. In order to form the optical phase shifter 230, a perturbation waveguide 235 (see FIG. 15) may be arranged adjacent to the second section 217 of the first waveguide 211 and the second waveguide 213. In addition, for example, referring to the right enlarged view of FIG. 14, the optical phase shifter 230 may include a second actuator 231 provided to move, for example, the second section 217 of the first waveguide in the second moving direction perpendicular to the first moving direction. As exemplarily illustrated in FIGS. 14 and 15, the second actuator 231 may be provided to move the perturbation waveguide 235 in the second moving direction. As another example, the second actuator 231 may be provided to move the first waveguide 211 or the second waveguide 213, which is a ring-shaped waveguide (transmission waveguide), in the second moving direction.

As described above, in each of the first unit cell 210 and the second unit cell 210', any one of the second section 217 of the first waveguide 211 and/or the second waveguide 213 and the perturbation waveguide 235 may be moved in the second moving direction by driving of the second actuator 231 in the second section 217 of the first waveguide 211 and the second waveguide 213, such that the phase of an optical signal traveling through the corresponding ring-shaped waveguide is changed by changing the effective refractive index of the optical mode of the ring-shaped waveguide according to adjustment of the gap between the second section 217 of the ring-shaped waveguide and the perturbation waveguide 235.

The third unit cell 210" may not include the optical phase shifter 230 in the second section 217 of the first or second waveguides 211 or 213.

FIG. 14 illustrates an example of the arrangement of the tunable optical coupler 220 and the arrangement of the optical phase shifter 230 of the first unit cell 210 and the second unit cell 210', but the embodiment is not limited thereto. The shapes of the first waveguide 211 and the second waveguide 213 constituting the first unit cell 210 and the second unit cell 210', the arrangement of the tunable optical coupler 220, the arrangement of the optical phase shifter 230, and the arrangement of the input/output waveguide 201 may vary depending on the design of the recirculating programmable photonic circuit 200 according to an embodiment.

As such, a ring-shaped waveguide of each unit cell 210 may be provided to form the first section 215 facing a ring-shaped waveguide of the adjacent unit cell 210'. The ring-shaped waveguide of the unit cell 210 may correspond to the first waveguide 211 formed in a closed-ring shape, and the ring-shaped waveguide of the adjacent unit cell 210' may correspond to the second waveguide 213 formed in a closed-ring shape.

As exemplarily illustrated in FIG. 15, the first waveguide 211 constituting the unit cell 210 may have a shape having at least three or more sides 211*a* and 211*b*. Here, the sides 211*a* and 211*b* may refer to straight sections of the first waveguide 211.

For example, the first waveguide 211 of the unit cell 210 may include a plurality of first sides 211*a* each forming the first section 215, and at least one second side 211*b* forming the second section 217, and may be provided such that a structure in which the first sides 211*a* and at least one second side 211*b* are extended to form a polygonal structure as a whole, and the first and second waveguides 211 and 213 may be repeatedly arranged such that the first sides 211*a* and 213*a* forming the first section 215 face each other, to form a two-dimensional array of the first and second waveguides 211 and 213. FIG. 15 illustrates an example in which the first waveguide 211 of the unit cell 210 includes three first sides 211*a* each forming the first section 215, and one second side 211*b* forming the second section 217, such that the structure in which the sides 211*a* and 211*b* are extended to form a polygonal shape as a whole. Also, the second waveguide 213 of the adjacent unit cell 210' may be formed to correspond to the first waveguide 211 of the unit cell 210, so that a polygonal shape is formed as a whole. By repeatedly arranging such polygonal shapes, a recirculating programmable photonic circuit 200 as illustrated in FIG. 14 may be configured.

As such, the programmable photonic circuit 200 according to an embodiment may be configured such that each of the above-described first waveguide 211 and second waveguide 213 is formed as a ring-shaped waveguide having two or more first sections 215 and at least one second section 217, and the first waveguides 211 and the second waveguides 213 are alternately arranged in a two-dimensional array such that the first sections 215 are adjacent to each other. In this case, the unit cell 210 may include the first or second waveguide 211 or 213 and at least one tunable optical coupler 220, and may or may not further include at least one optical phase shifter 230.

Referring to the right enlarged view of FIG. 14 and FIG. 15, for example, the unit cell 210 may include the ring-shaped first waveguide 211 having three first sections 215 and one second section 217, the tunable optical couplers 220 provided in two first sections 215, and the optical phase shifter 230 provided in the second section 217.

The tunable optical coupler 220 arranged in the unit cell 210 may include the first section 215 of the first waveguide 211, the first section 215 of the second waveguide 213 of the adjacent unit cell 210' arranged in parallel and adjacent to the first section 215 of the first waveguide 211, and the first actuator 221 for moving the first section 215 of the first waveguide 211. The first actuator 221 may be provided to move the first section 215 of the first waveguide 211 in the first moving direction. In this case, the first section 215 of the first waveguide 211 may operate as a movable waveguide. The first moving direction is a direction in which the gap between the first sections 215 of the first waveguide 211 and the adjacent second waveguide 213 is changed, and may be the horizontal direction or the vertical direction. In the first section 215, the first waveguide 211 and the adjacent second waveguide 213 may be arranged such that the gap therebetween causes the optical coupling efficiency to be adjusted according to the driving of the first actuator 221. In addition, the first section 215 may be determined to include a length at which optical coupling between the first waveguide 211 and the adjacent second waveguide 213 may be sufficiently achieved.

The optical phase shifter 230 arranged in the unit cell 210 may include the second section 217 of the first waveguide 211, the perturbation waveguide 235 arranged adjacent and in parallel to the second section 217 of the first waveguide 211, and the second actuator 231 for moving any one of the second section 217 of the first waveguide 211 and the perturbation waveguide 235. For example, the second actuator 231 may be provided to move the perturbation waveguide 235 in the second moving direction. In this case, the perturbation waveguide 235 may operate as a movable waveguide, and the second section 217 of the first waveguide 211 may correspond to a fixed waveguide. The second moving direction Is a direction in which the gap between the second section 217 of the first waveguide 211 and the perturbation waveguide 235 is changed, and may be the horizontal direction or the vertical direction. The first waveguide 211 and the adjacent perturbation waveguide 235 may be arranged such that the gap therebetween in the second section 217 causes the effective refractive index of the optical mode of the second section 217 of the transmission waveguide, i.e., the first waveguide 211, to be adjusted according to the driving of the second actuator 231. In addition, the lengths of the second section 217 and the perturbation waveguide 235 and the gap therebetween are determined to include a length at which a phase change according to a change in the effective refractive index of the optical mode of the first waveguide 211, which is the transmission waveguide, may be sufficiently achieved. Similar to the unit cell 210, in the adjacent unit cell 210', the optical phase shifter 230 may be arranged in the second section 217 of the second waveguide 213, and the optical phase shifter 230 of the adjacent unit cell 210' may be provided and operated to change the phase by changing the effective refractive index of the optical mode of the second waveguide 213, which is a transmission waveguide.

Figure 16A:
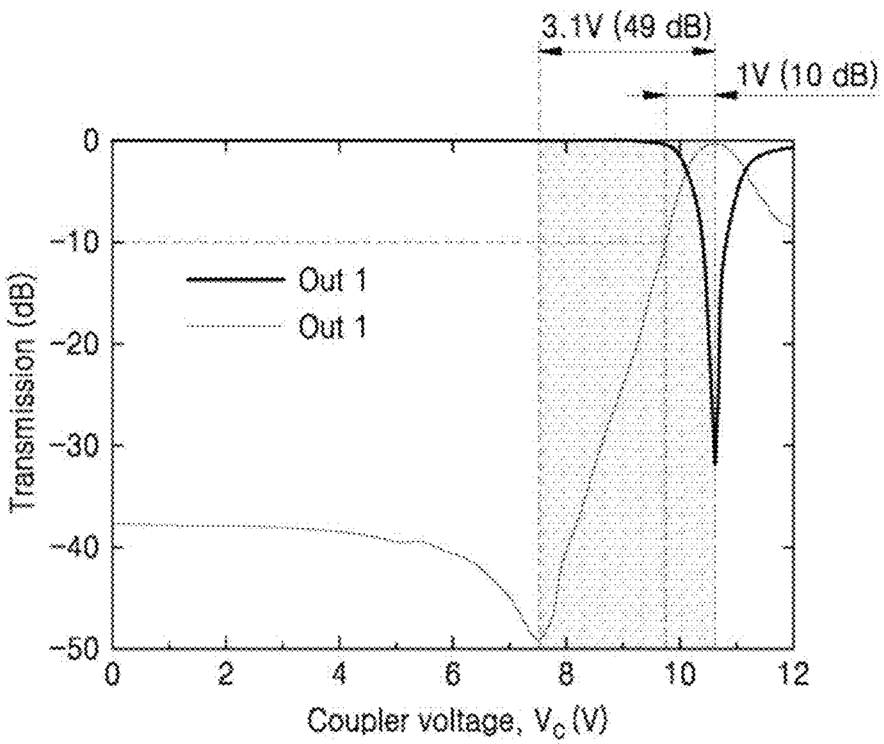
FIGS. 16A to 16C are graphs exemplarily showing measured characteristics of a tunable optical coupler of a programmable photonic circuit according to an embodiment.
Figure 16B:
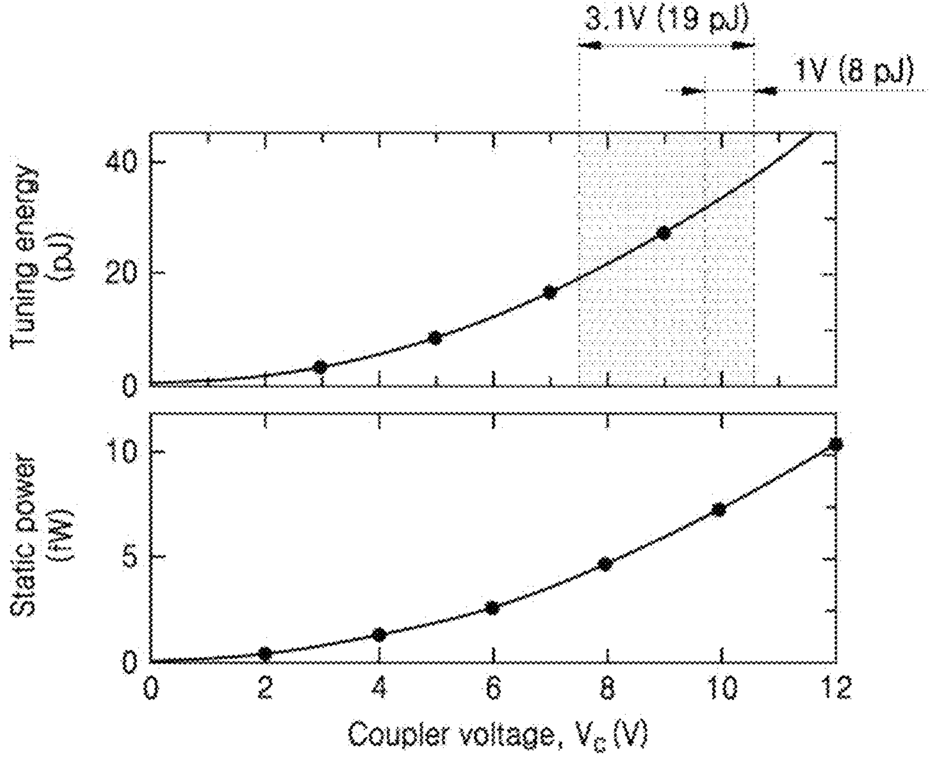
Figure 16C:
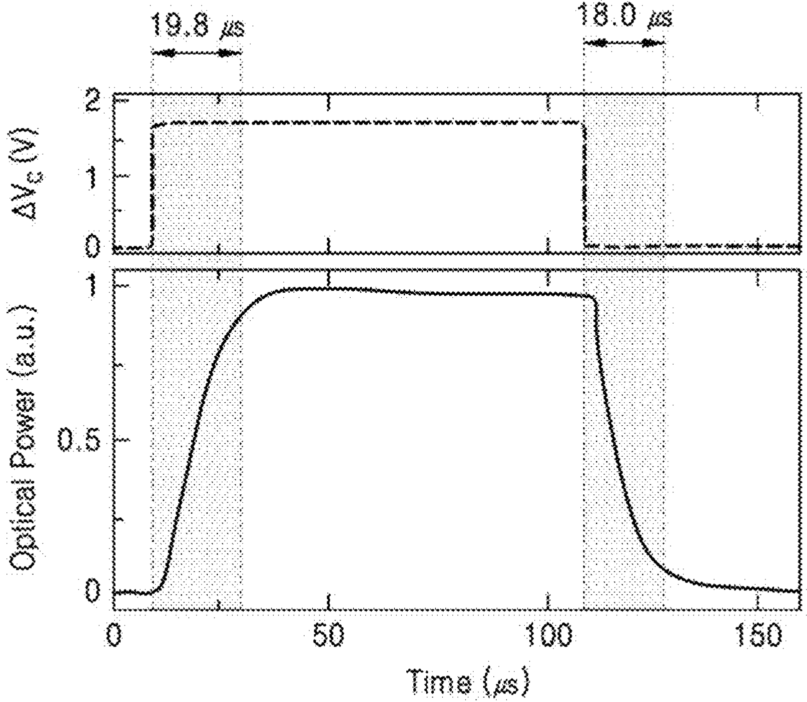

FIGS. 16A to 16C are graphs exemplarily showing measured characteristics of a tunable optical coupler of a programmable photonic circuit according to an embodiment.

FIGS. 16A and 16B exemplarily show response characteristics of a MEMS-based tunable optical coupler illustrated in FIGS. 2, 3, and 14 according to applied voltage, and tuning energy and static power for obtaining such response characteristics, and FIG. 16C exemplarily shows the response time of a tunable optical coupler according to the application of the driving voltage $V_c$. In FIG. 16A, the coupler voltage on the horizontal axis represents the driving voltage $V_c$ applied to the first actuator 21 of the tunable optical coupler, for example, as illustrated in FIG. 3, and the vertical axis represents transmission outputs Out1 and Out2 of the first waveguide 11 and the second waveguide 13 after passing through the tunable optical coupler, in dB. FIG. 16B shows the tuning energy for reaching the driving voltage $V_c$ corresponding to FIG. 16A, and the static power for holding at the corresponding driving voltage $V_c$. FIG. 16C shows that the first actuator 21 of the tunable optical coupler exhibits good response characteristics to the one-step alternating driving voltage $V_c$.

Referring to FIG. 3, when light having a wavelength of about 1550 nm is input only to In1 and the driving voltage $V_c$ applied to the first actuator 21 is tuned, transmission characteristics of the outputs Out1 and Out2 according to the change in optical coupling between the first waveguide 11 and the second waveguide 13 is changed by about 10 dB and about 49 dB for a voltage change of about 1 V and a voltage change of about 3.1 V, respectively, as may be seen from the shaded areas of FIGS. 16A and 16B.

Figure 17A:
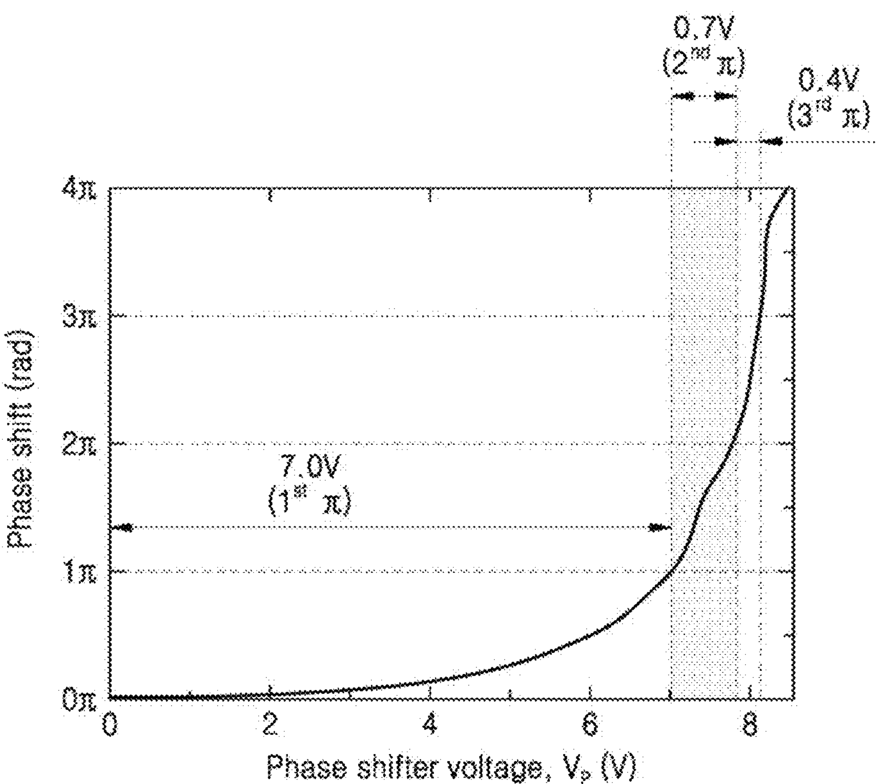
FIGS. 17A to 17C are graphs exemplarily showing measured characteristics of an optical phase shifter of a programmable photonic circuit according to an embodiment.
Figure 17B:
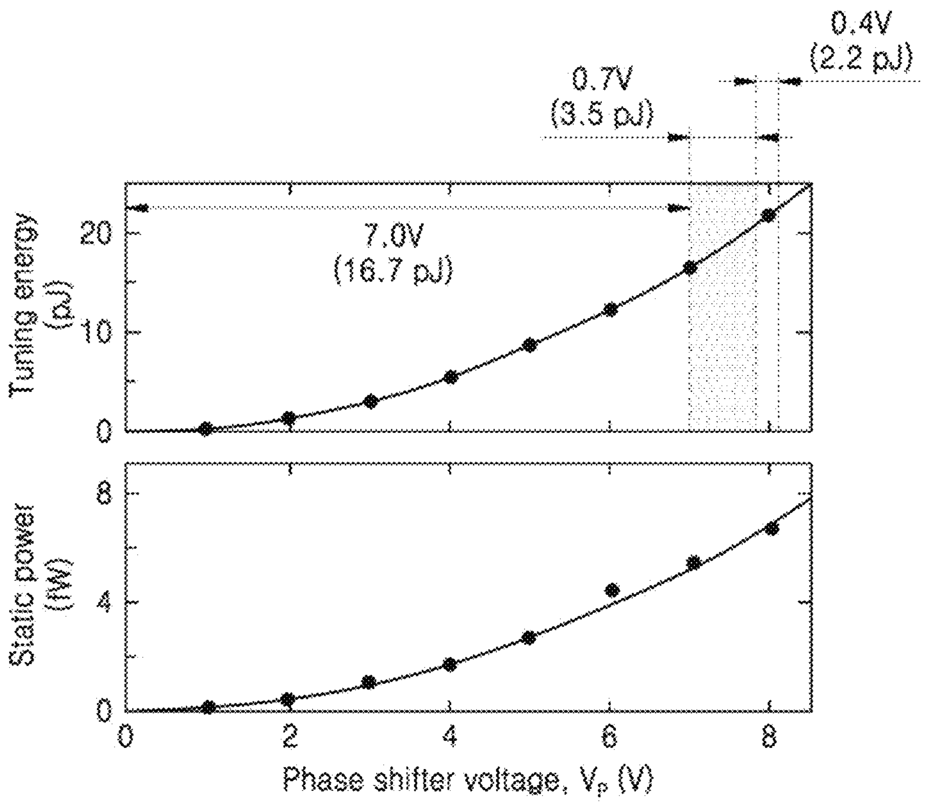
Figure 17C:
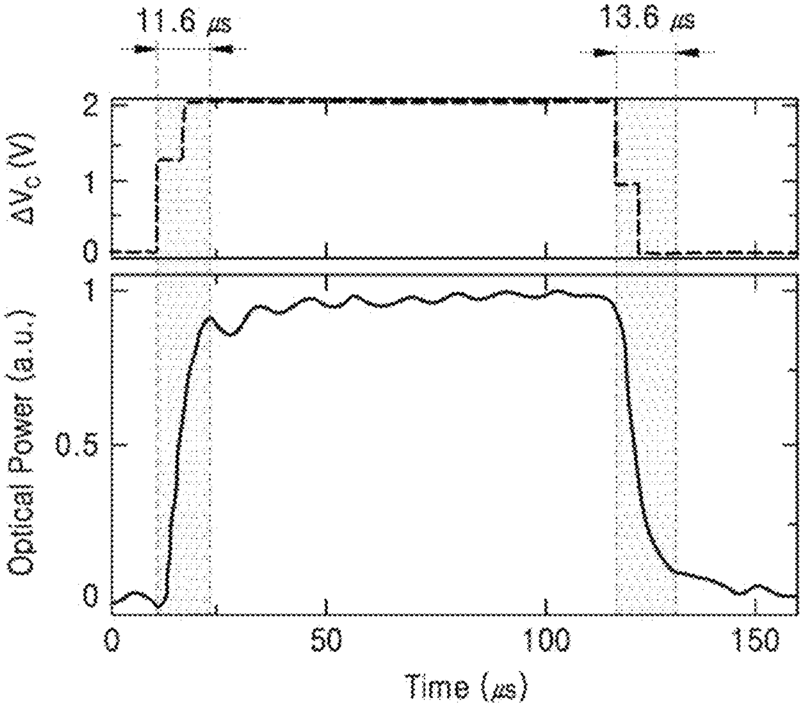

FIGS. 17A to 17C are graphs exemplarily showing measured characteristics of an optical phase shifter of a programmable photonic circuit according to an embodiment.

FIGS. 17A and 17B exemplarily show phase shift characteristics of a MEMS-based tunable optical phase shifter illustrated in FIGS. 2, 5, and 14 according to applied voltage, and tuning energy and static power for obtaining such phase shift characteristics, and FIG. 17C exemplarily shows the response time of a tunable optical phase shifter according to the application of the driving voltage $V_p$.

In FIG. 17A, the phase shifter voltage on the horizontal axis represents the driving voltage $V_p$ applied to the second actuator 31 of the optical phase shifter, for example, as illustrated in FIG. 5, and the vertical axis represents the phase shift of light passing through the optical phase shifter in radians. FIG. 17B shows the tuning energy for reaching the driving voltage $V_p$ corresponding to FIG. 17A, and the static power for holding at the corresponding driving voltage $V_p$. FIG. 17C shows that the second actuator 31 of the optical phase shifter exhibits good response characteristics without mechanical vibration to the two-step alternating driving voltage $V_p$.

As may be seen from FIG. 17A, when the MEMS-based tunable optical phase shifter of the programmable photonic circuit according to an embodiment is used, by increasing the driving voltage $V_p$ in the range of about 10V or less, for example, a phase shift up to about 47 may be obtained. For example, when the driving voltage $V_p$ is increased to about 7.0 V, a phase shift of about 1 $\pi$ is obtained, then when the driving voltage $V_p$ is further increased by about 0.7 V, a phase shift of 1 $\pi$ is obtained, and then when the driving voltage $V_p$ is further increased by about 0.4 V, a phase shift of 1 $\pi$ may be obtained. As described above, a nonlinear phase shift may be obtained as the driving voltage $V_p$ increases, and a phase shift in the range of about 4 $\pi$ may be obtained in the range of the driving voltage $V_p$ of about 10V or less.

Figure 18:
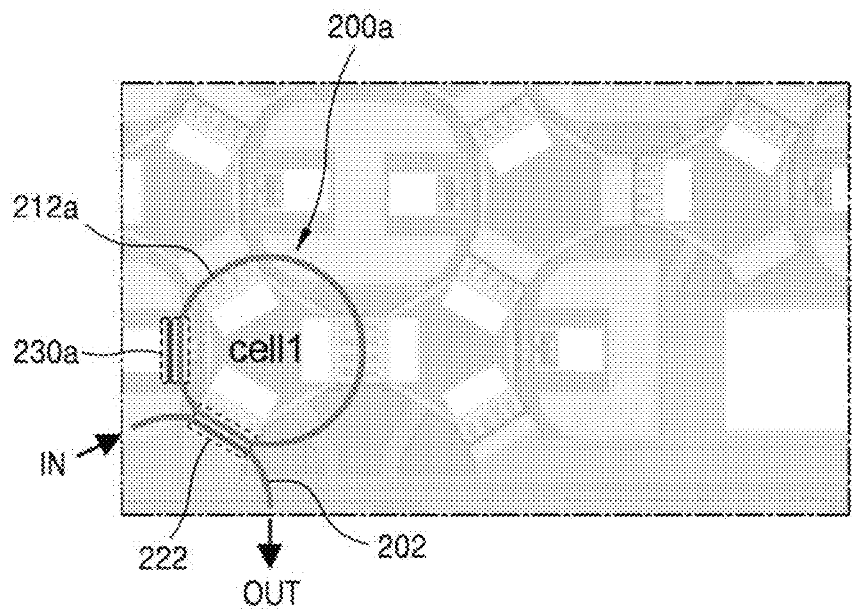
FIGS. 18 to 20 illustrate various configurations implemented by a programmable photonic circuit according to an embodiment.
Figure 19:
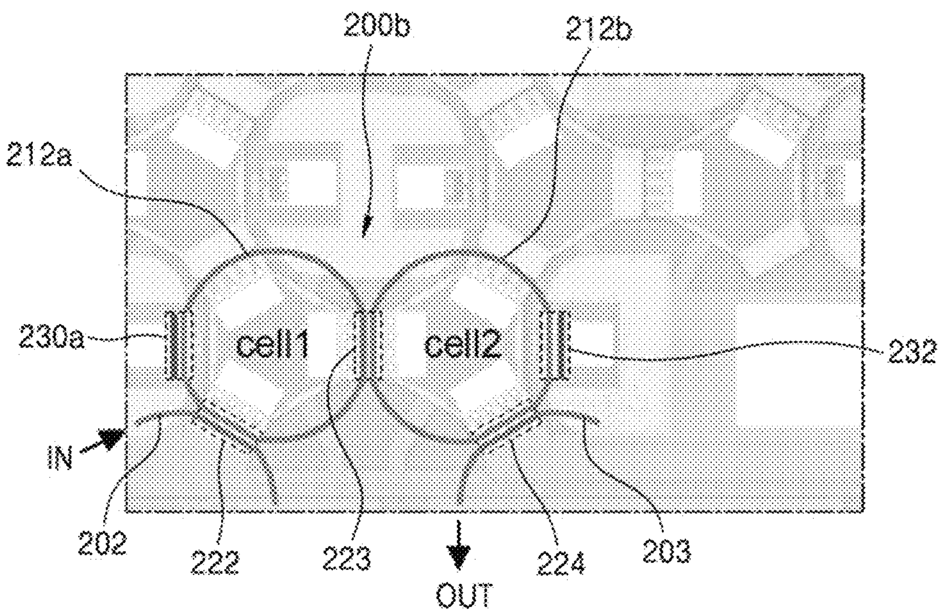
Figure 20:
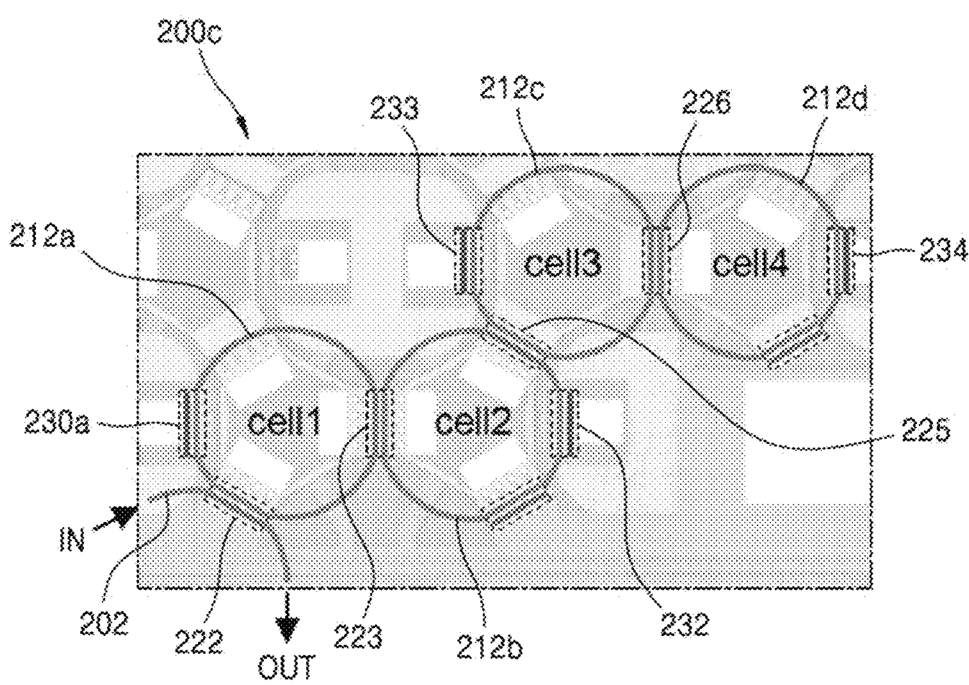

FIGS. 18 to 20 illustrate various configurations implemented by the programmable photonic circuit 200 according to an embodiment. FIG. 18 illustrates an example in which a photonic circuit 200*a* configures a combination of a bus waveguide 202 and one ring resonator 212*a*, FIG. 19 illustrates an example in which a photonic circuit 200*b* configures an add-drop filter including two ring resonators 211*a* and 212*b*, and FIG. 20 illustrates an example in which a plurality of ring resonators 212*a*, 212*b*, 212*c*, and 212*d* of a photonic circuit 200*c* constitute a coupled-resonator optical waveguide (CROW).

Figure 21A:
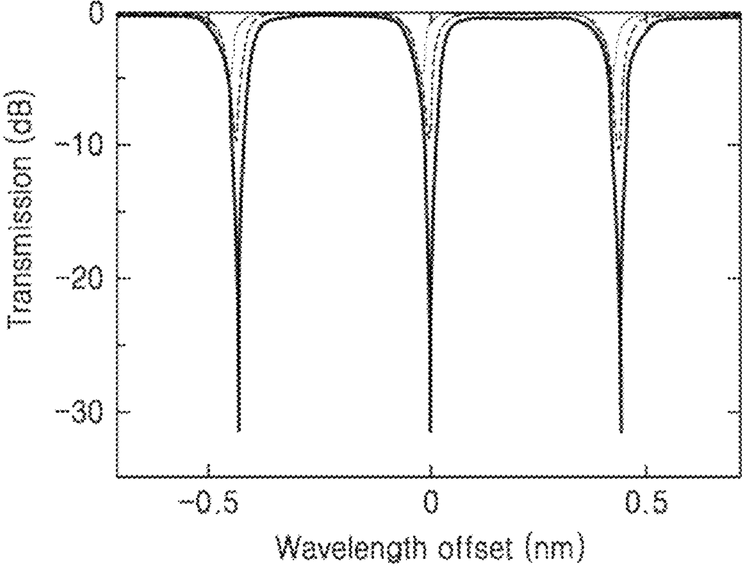
FIG. 21A is a graph showing the relationship between a resonant wavelength of a ring resonator and optical coupling in a tunable optical coupler.
Figure 21B:
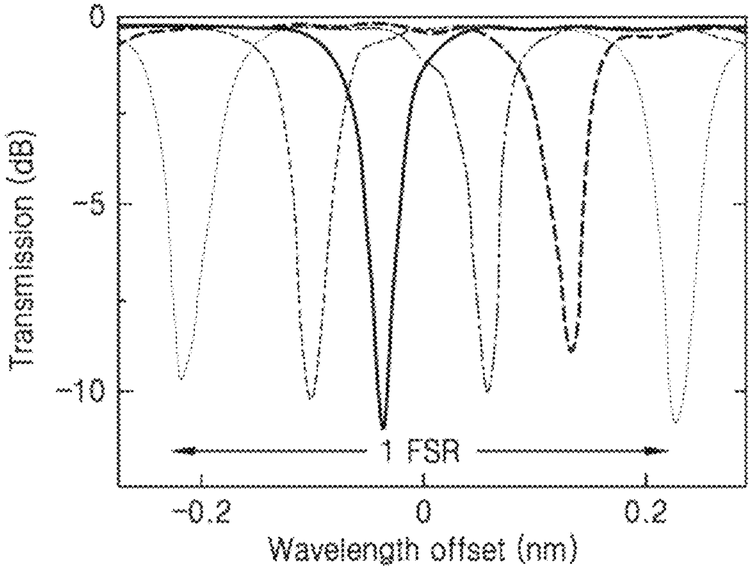
FIG. 21B shows resonant frequency tuning according to adjustment of an optical phase shifter of a ring resonator.

Referring to FIG. 18, the photonic circuit 200*a* includes one unit cell cell1, and the unit cell cell1 includes the ring resonator 211*a* formed as a ring-shaped waveguide, a tunable optical coupler 222, and an optical phase shifter 230*a*. By adjusting the driving voltage $V_c$ applied to the tunable optical coupler 222 provided between the bus waveguide 202 (input/output waveguide) and the ring resonator 211*a* to control the vertical movement of a moving waveguide, that is, the bus waveguide 202 or the ring resonator 211*a*, the traveling path of an optical signal input through the bus waveguide 202 may be controlled. As exemplarily illustrated in FIG. 18, an optical signal input to the bus waveguide 202 may be coupled to the ring resonator 211*a* by the tunable optical coupler 222, then coupled to the bus waveguide 202 by the tunable optical coupler 222 while being guided along the ring resonator 211*a*, and then output. In this case, the optical coupling rate of the tunable optical coupler 222 and the magnitude of the optical signal output thereby may vary depending on the resonant wavelength of the ring resonator 211*a* as shown in FIG. 21A. The resonant wavelength of the ring resonator 211*a* may be tuned as shown in FIG. 21B by adjusting the driving voltage $V_p$ applied to the optical phase shifter 230*a* provided on the path of the ring resonator 211*a*. Therefore, the magnitude of the optical signal coupled from the ring resonator 211*a* to the bus waveguide 202 and then output may vary depending on the phase shift according to the wavelength of the optical phase shifter 230*a*. FIG. 21A is a graph showing the relationship between the resonant wavelength of the ring resonator 211*a* and optical coupling in the tunable optical coupler 222, wherein the wavelength offset on the horizontal axis represents the degree to which the wavelength of the optical signal input to the photonic circuit 200*a* deviates from the resonant wavelength of the ring resonator 211*a*, and the vertical axis represents the change in transmission rate according to the wavelength offset of the optical signal. FIG. 21B shows resonant frequency tuning according to adjustment of the optical phase shifter 230*a* of the ring resonator 211*a*.

Referring to FIG. 19, the photonic circuit 200*b* may include two unit cells cell1 and cell2 to configure an add-drop filter including two ring resonators, the unit cell cell1 may include the ring resonator 211*a* formed as ring-shaped waveguide, the tunable optical coupler 222, and the optical phase shifter 230*a*, and the unit cell cell2 may include the ring resonator 211*b* formed as a ring-shaped waveguide, tunable optical couplers 223 and 224, and an optical phase shifter 232.

Figure 22A:
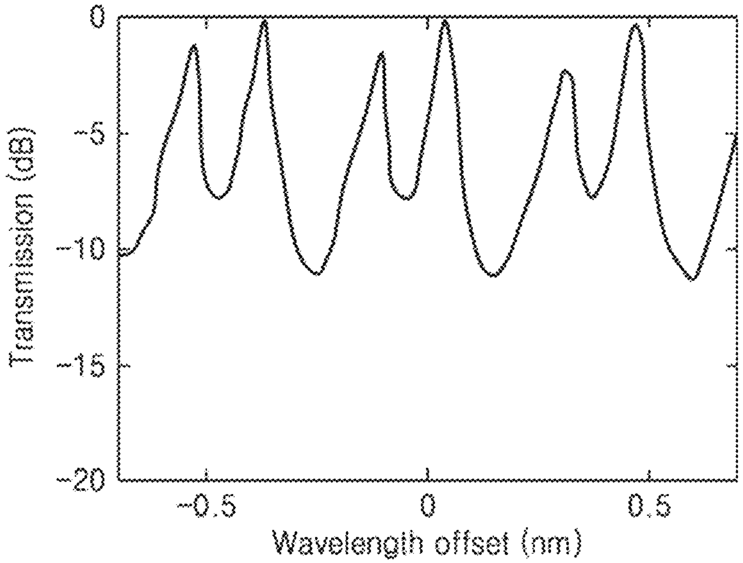
FIG. 22A shows a transmission spectrum of an add-drop filter including two ring resonators.
Figure 22B:
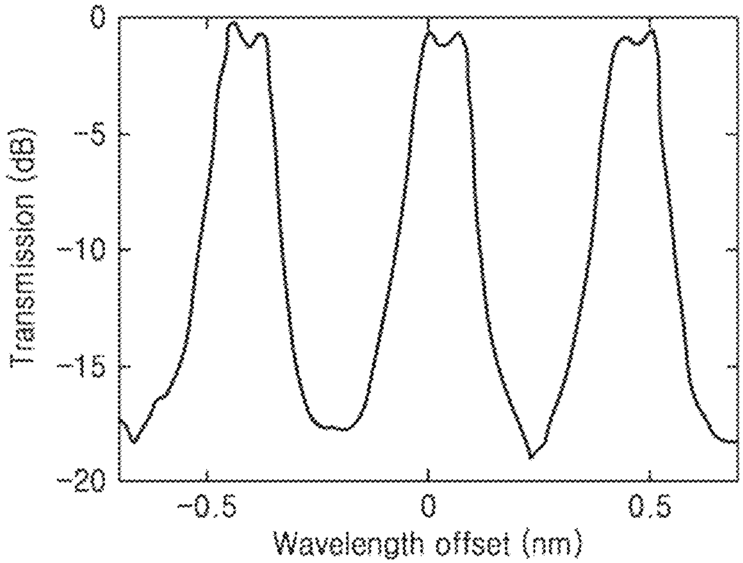
FIG. 22B shows a transmission spectrum of a $2^{nd}$-order add-drop filter formed by controlling an optical phase shifter in a ring resonator.

An optical signal input to the bus waveguide 202 is coupled to the ring resonator 211*a* of the unit cell cell1 by the tunable optical coupler 222, and travels along the ring resonator 211*a*. The optical signal of the ring resonator 211*a* may be coupled to the ring resonator 211*b* of the unit cell cell2 by the tunable optical coupler 223, and the optical signal guided by the ring resonator 211*b* may be coupled to a bus waveguide 203 by the tunable optical coupler 224, and then output. In this case, the resonance peaks of the two ring resonators 211*a* and 211*b* are not aligned as in FIG. 22A, but by controlling the optical phase shifters 230*a* and 232 in the ring resonators 211*a* and 211*b*, a $2^{nd}$-order add-drop filter with a wide passband and a good extinction ratio as shown in FIG. 22B may be formed. FIG. 22A shows the transmission spectrum of an add-drop filter including two ring resonators 211*a* and 211*b*, and FIG. 22B shows the transmission spectrum of a $2^{nd}$-order add-drop filter formed by controlling the optical phase shifters 230*a* and 232 in the ring resonators 211*a* and 211*b*.

Referring to FIG. 20, the photonic circuit 200*c* may include, for example, three or more unit cells to configure a CROW. That is, the number of ring resonators configuring the CROW may be, for example, three or greater. For example, the CROW may include four ring resonators. Each of two ring resonators may configure a CROW, and four ring resonators may configure a double CROW.

As exemplarily illustrated in FIG. 20, the photonic circuit 200*c* may include, for example, four unit cells cell1, cell2, cell3, and cell4, which may include ring resonators 211*a*, 211*b*, 211*c*, and 211*d* formed as ring-shaped waveguides, tunable optical couplers 222, 223, 225, and 226, and optical phase shifters 230*a*, 232, 233, and 234, respectively.

An optical signal input to the bus waveguide 202 is coupled to the ring resonator 211*a* of the unit cell cell1 by the tunable optical coupler 222 and then guided along the ring resonator 211*a*. The optical signal of the ring resonator 211*a* is coupled to the ring resonator 211*b* of the unit cell cell2 by the tunable optical coupler 223. The optical signal guided by the ring resonator 211*b* is coupled to the ring resonator 211*c* of the unit cell cell3 by the tunable optical coupler 225. The optical signal guided by the ring resonator 211*c* is coupled to the ring resonator 211*d* of the unit cell cell4 by the tunable optical coupler 226. Light guided by the ring resonator 211*d* of the unit cell cell4 may be sequentially coupled to the ring resonator 211*c*, the ring resonator 211*b*, and the ring resonator 211*a*, and the optical signal guided by the ring resonator 211*a* may be coupled to the bus waveguide 202 and then output.

Figure 23A:
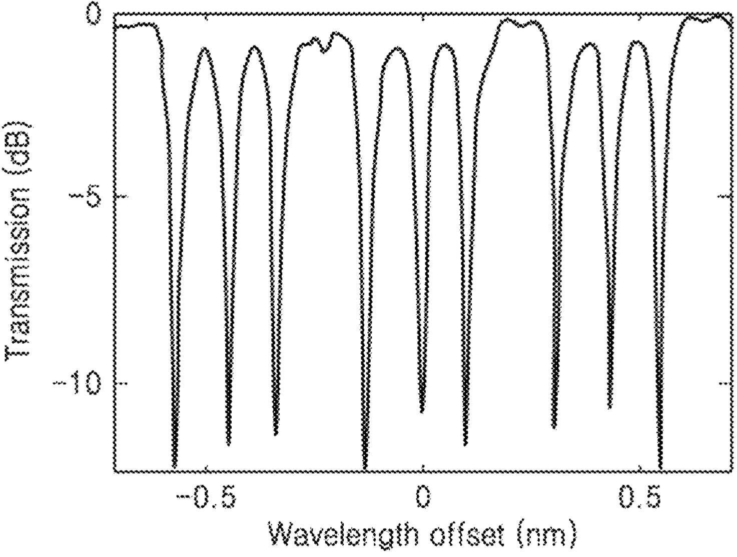
FIG. 23A shows a transmission spectrum of a coupled-resonator optical waveguide in which three ring resonators are coupled.
Figure 23B:
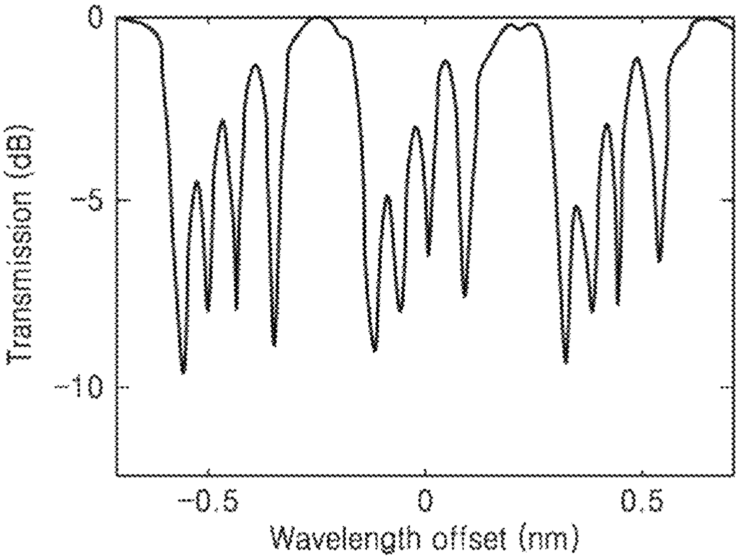
FIG. 23B shows a transmission spectrum of a coupled-resonator optical waveguide in which four ring resonators are coupled.

In this case, the resonance peaks of the ring resonators 211*a*, 211*b*, 211*c*, and 211*d* may be aligned as shown in FIGS. 23A and 23B, by controlling the optical phase shifters 230*a*, 232, 233, and 234 in the respective ring resonators. FIG. 23A shows the transmission spectrum of a CROW in which three ring resonators are combined with each other, and FIG. 23B shows the transmission spectrum of a CROW in which four ring resonators are combined with each other.

Here, the transmission spectra shown in FIGS. 21A, 21B, 22A, 22B, 23A, and 23B were measured with respect to input light having a center wavelength of about 1550 nm. Such transmission spectral responses may be measured by using a combination of an external-cavity laser adjustable near the 1550-nm wavelength, and a photodetector.

It may be seen, from FIGS. 21A, 21B, 22A, 22B, 23A, and 23B, that the number of unit cells of the recirculating programmable photonic circuit 200 according to an embodiment may be expandable.

As described above, the programmable photonic circuit according to an embodiment may configure a tunable optical gate capable of 2×2 unitary transformation, may configure a feed-forward photonic circuit capable of performing arbitrary N×N matrix multiplication, or may configure a recirculating photonic circuit.

Figure 24:
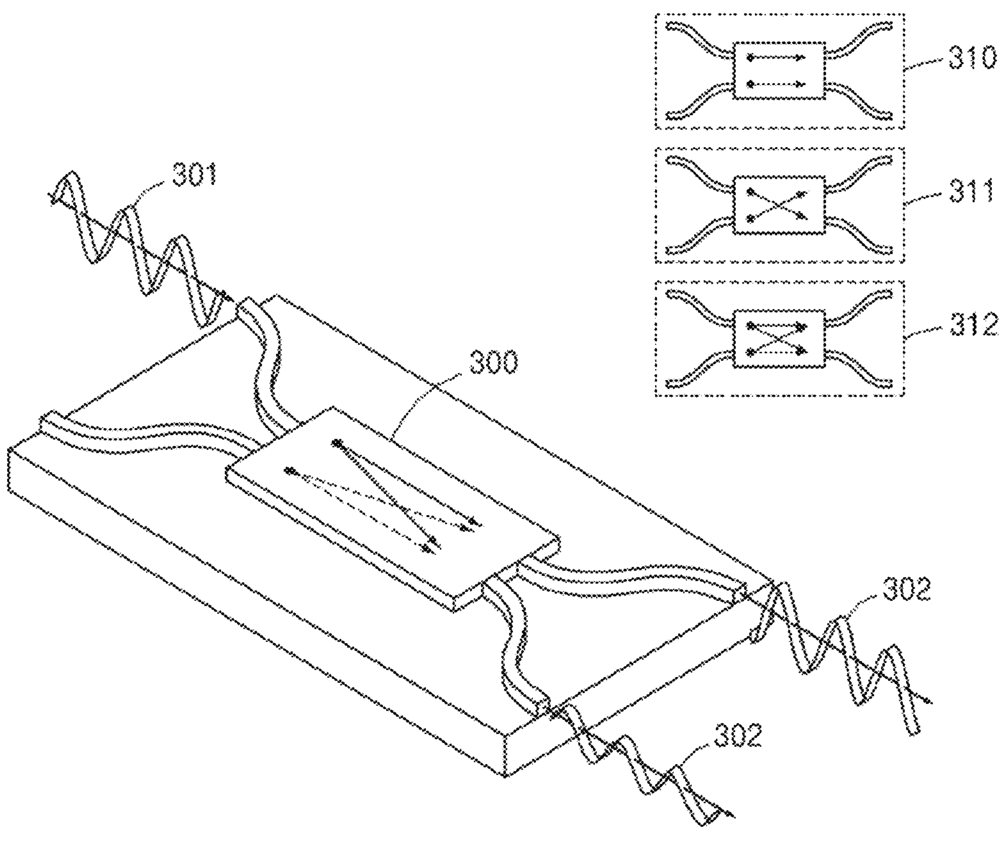
FIG. 24 illustrates a state in which an optical signal is transferred on an input waveguide and an output waveguide connected to a 2×2 optical gate, in a photonic circuit or a feed-forward photonic circuit including a tunable optical gate according to an embodiment.

FIG. 24 illustrates a state in which an optical signal is transferred on an input waveguide and an output waveguide connected to a 2×2 optical gate 300, in the photonic circuit 10 or the feed-forward photonic circuit 100 including a tunable optical gate according to an embodiment.

For example, when an optical signal 301 is input to the 2×2 optical gate 300, the magnitude, waveguide path, and the like of an output optical signal 302 may vary depending on whether the optical gate 300 is in a pass state 310, a cross state 311, or a partial coupling state 312.

That is, the path of an optical signal guided by waveguides connected to the 2×2 optical gate 300 may be changed according to the state of the 2×2 optical gate 300.

For example, in the pass state 310, there is no coupling between waveguides that transfer an optical signal, and thus, the optical signal may travel only through existing path.

In the cross state 311, an optical signal may be transferred through a cross path by optical coupling between waveguides.

In the partial coupling state 312, optical coupling between waveguides that transfer an optical signal may be partially made, and paths through which optical signals are transferred may overlap each other.

Meanwhile, the programmable photonic circuit 200 according to an embodiment may include a two-dimensional array of unit cells 210, may input and output an optical signal through the input/output waveguide 201, and may control, based on computer control, the tunable optical coupler 220 and the optical phase shifter 230 of each unit cell 210 by controlling the driving voltages $V_c$ and $V_p$ applied through the control unit 50, thereby operating as a recirculating photonic circuit. An output optical signal of the recirculating photonic circuit may be detected by using a photodetector, to process data.

The recirculating programmable photonic circuit 200 according to an embodiment may be connected to, for example, a radio-frequency (RF) modulator to operate as an optical switch controlling an optical signal input from the RF modulator, thereby being implemented as an RF optical filter.

In addition, the recirculating programmable photonic circuit 200 according to an embodiment may be combined with an external-cavity laser and applied with the concept of wavelength-division multiplexing of optical communication, to be used as an optical parallel matrix-vector multiplier, which is a system capable of performing parallel matrix operations.

As such, the programmable photonic circuits 10, 100, and 200 according to embodiments may provide various applications, such as a parallel matrix-vector multiplier or an RF optical filter.

Hereinafter, the MEMS-based first actuator 21 or 221 of the tunable optical coupler 20 or 220, and the MEMS-based second actuator 31 or 231 of the optical phase shifter 30 or 230, which are applied to the programmable photonic circuit 10, 100, or 200 according to an embodiment, will be described in detail.

Figure 25:
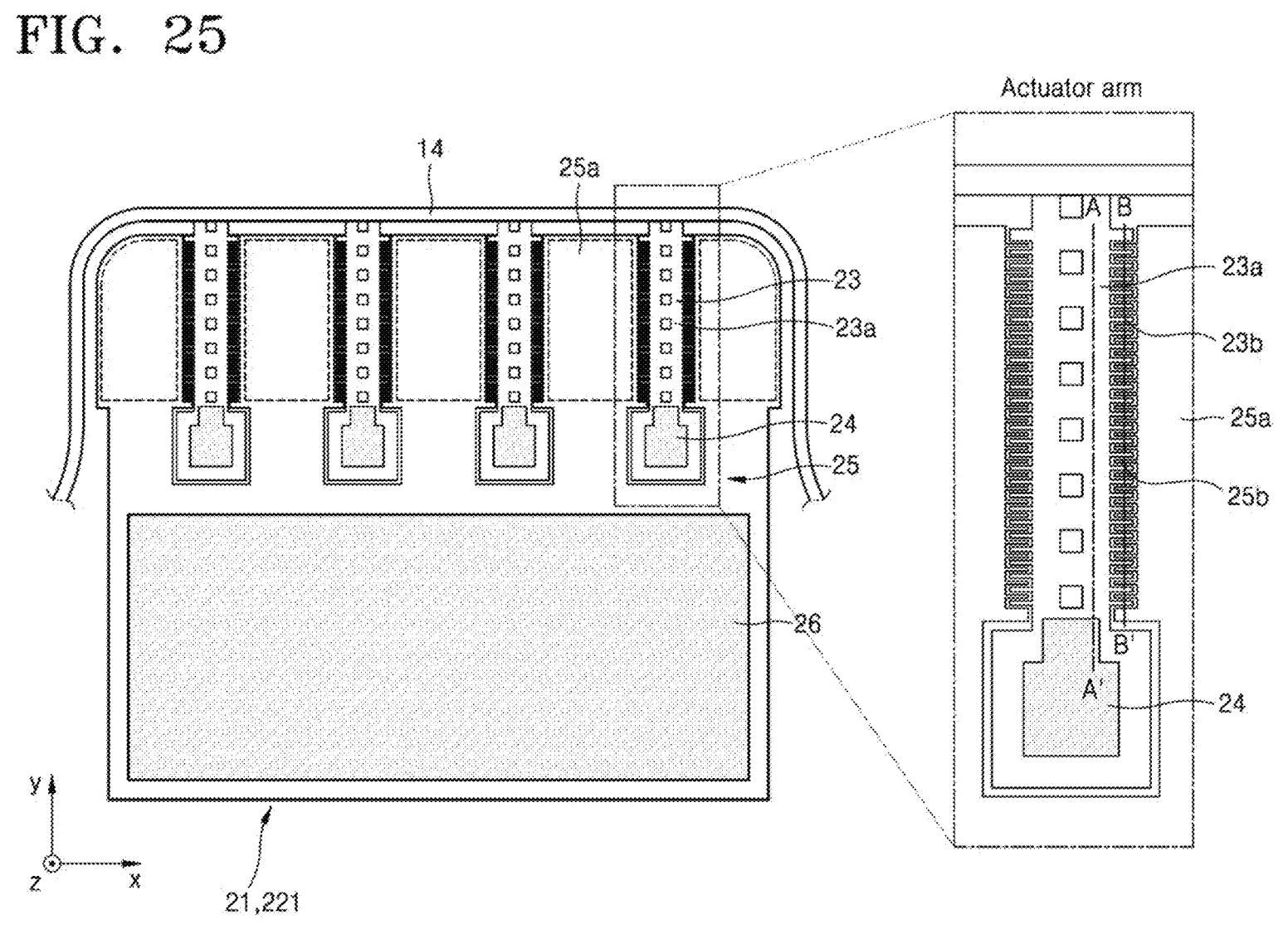
Figure 26:
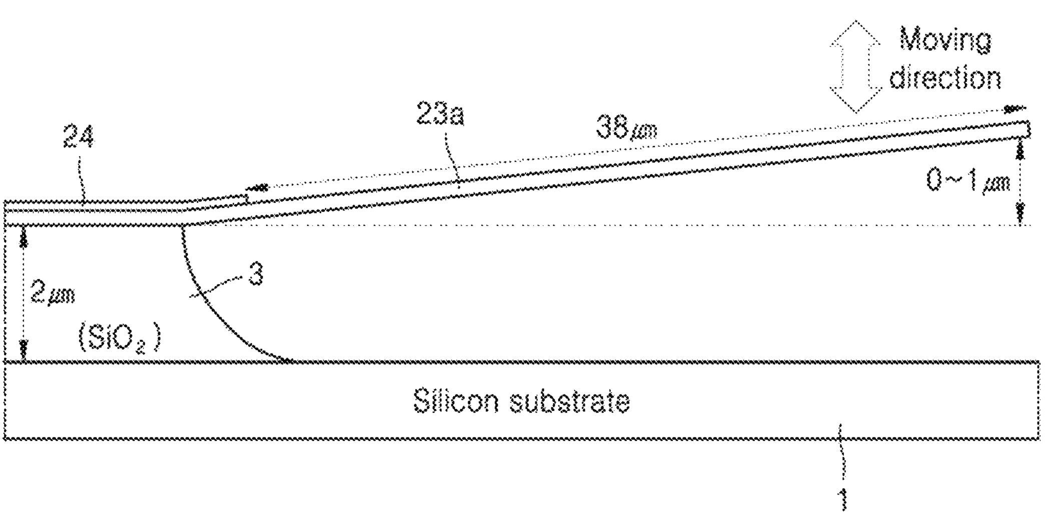
FIG. 26 is a cross-sectional view taken along line AA' of FIG. 25.

FIG. 25 is a plan view schematically illustrating an example of the first actuator 21 or 221 of the tunable optical coupler 20 or 220 applied to the programmable photonic circuit 10, 100 or 200 according to an embodiment. FIG. 26 is a cross-sectional view taken along line AA' of FIG. 25, and FIG. 27 is a cross-sectional view taken along line BB' of FIG. 25.

Figure 27:
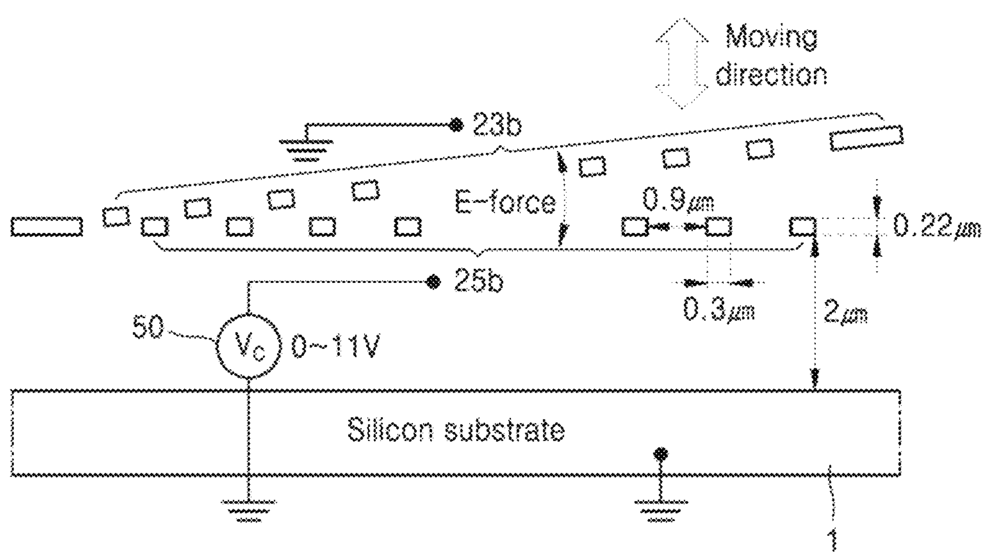
FIG. 27 is a cross-sectional view taken along line BB' of FIG. 25.

Referring to FIGS. 25 to 27, the first actuator 21 or 221 may include the first fixed part 25, the first movable part 23 provided to be movable relative to the first fixed part 25, and electrodes 24 and 26 for electrical connection to the first movable part 23 and the first fixed part 25. The first movable part may be provided to move, under control by the control unit 50, the movable waveguide 14, i.e., the first waveguide 11 or 211 or the second waveguide 13 or 213, in the vertical direction (e.g., the z-axis direction) The driving voltage $V_c$ may be applied to the first fixed part 25 through the electrode 26, under control by the control unit 50. The first movable part 23 may be electrically grounded through the electrode 24. The first actuator 21 may be provided to be driven in an electrostatic manner. Accordingly, the first actuator 21 consumes power only during operation, and the power consumption during operation may also be significantly low.

The first fixed part 25 and the first movable part 23 may be formed with combs that engage each other without colliding with each other in a direction forming an angle with respect to the driving axis of the first movable part 23, for example, in the vertical direction. The driving axis may be parallel to the y-axis.

For example, the first movable part 23 may include an actuator arm **23*a* in the lengthwise direction, and an end of the actuator arm 23*a* may be coupled or connected to the movable waveguide 14. The lengthwise direction (e.g., the y-axis direction) of the actuator arm 23*a* may be parallel to the driving axis. A plurality of combs extending in a direction perpendicular to the driving axis (e.g., the x-axis direction) may be formed on both sides of the actuator arm 23*a* to constitute a movable comb 23*b***.

The first actuator 21 or 221 may include a plurality of actuator arms **23*a*, which may be partially patterned to have a weight that exhibits an appropriate actuation force and thus may include a plurality of grooves or through holes. A comb anchor 25*a* of the first fixed part 25 may be formed between the actuator arms 23*a*. A plurality of combs extending in a direction perpendicular to the driving axis of the actuator arm 23*a* to engage the movable comb 23*b* without colliding with each other may be formed on a lateral portion of the comb anchor 25*a*, and thus, may constitute a fixed comb 25*b***.

In addition, the first actuator 21 or 221 may be provided such that the movable waveguide 14 is movable in the vertical direction (e.g. the Z-axis direction) by the plurality of actuator arms **23*a*. The comb anchors 25*a* may be formed on both sides of the actuator arm 23*a*, and the fixed comb 25*b* may extend from the comb anchor 25*a* in a direction perpendicular to the driving axis (e.g., the x-axis direction) to engage the movable comb 23*b*** without a collision.

As such, the first fixed part 25 may have the fixed comb **25*b*, the first movable part 23 may have the movable comb 23*b*, and the fixed comb 25*b* and the movable comb 23*b* may be formed to engage each other without a collision. When the driving voltage V, is applied to the first fixed part 25 and the first movable part 23 is electrically grounded, as illustrated in FIGS. 26 and 27, the actuator arm 23*a* of the first movable part 23 may be moved in the vertical direction by an electric force E-force generated between the fixed comb 25*b* and the movable comb 23*b*, accordingly, the movable waveguide 14 may be moved in the vertical direction, and thus, optical coupling may be adjusted by adjusting the size of the vertical offset between the fixed waveguide 12 and the movable waveguide 14 as illustrated in FIG. 4. In the programmable photonic circuit 10, 100, or 200 according to an embodiment, in a case in which the movable waveguide 14 is the first waveguide 11 or 211, the fixed waveguide 12 may be the second waveguide 13 or 213, and in a case in which the movable waveguide 14 is the second waveguide 13 or 213, the fixed waveguide 12 may be the first waveguide 11 or 211**.

For example, the first actuator 21 or 221 may be formed as follows. A process of forming a silicon oxide layer on a silicon substrate to a thickness of, for example, about 2 μm, and forming a silicon layer may be performed. A silicon-on-insulator (SOI) wafer may be used as a substrate for manufacturing the first actuator 21 or 221. The silicon layer may be formed of, for example, crystalline silicon, and may be formed to a thickness of sub-micron, for example, about 220 nm. Thereafter, the silicon layer may be patterned to form the first fixed part 25 and the first movable part 23 such that the fixed comb **25*b* and the movable comb 23*b* engage each other without colliding with each other, and the electrodes 24 and 26 may be formed on portions of the silicon layer corresponding to a portion of a hinge axis of the first movable part 23 and one side of the first fixed part 25, respectively, for electrical connection to drive the first movable part 23. A movable part of the first movable part 23, that is, an end of the actuator arm 23*a* may be formed to be coupled to the movable waveguide 14. Here, being formed to be coupled may include being integrally formed. As exemplarily illustrated in FIGS. 26 and 27, a portion of a silicon oxide layer 3 may be removed through an etching process or the like, so as to move the movable part of the first movable part 23, that is, the actuator arm 23***a*, in the vertical direction.

FIG. 26 illustrates an example in which the actuator arm 23*a* is formed to be spaced apart from a substrate 1, for example, a silicon substrate, by the thickness of the silicon oxide layer 3, which is about 2 μm, and have a length of, for example, about 38 μm, and is moved in the range of about 0 μm to about 1 μm in the vertical direction (i.e., the moving direction), according to the applied driving voltage $V_c$. FIG. 27 illustrates an example in which the thickness of the silicon layer forming the fixed comb 25*b* and the movable comb 23*b* is about 0.22 μm, the interval of a comb patterns is about 0.9 μm, the width of the comb pattern is about 0.3 μm, the movable comb 23*b* of the movable part 23 is grounded, and the driving voltage $V_c$ within the range of about 0 V to about 11 V is applied from the control unit 50 to the fixed comb 25*b* of the first fixed part 25. The substrate 1 may also be grounded.

The material and numerical data in FIGS. 26 and 27 are only examples, the embodiment is not limited thereto, and the material and numerical data may vary depending on the configuration and design conditions of the photonic circuit.

Figure 28:
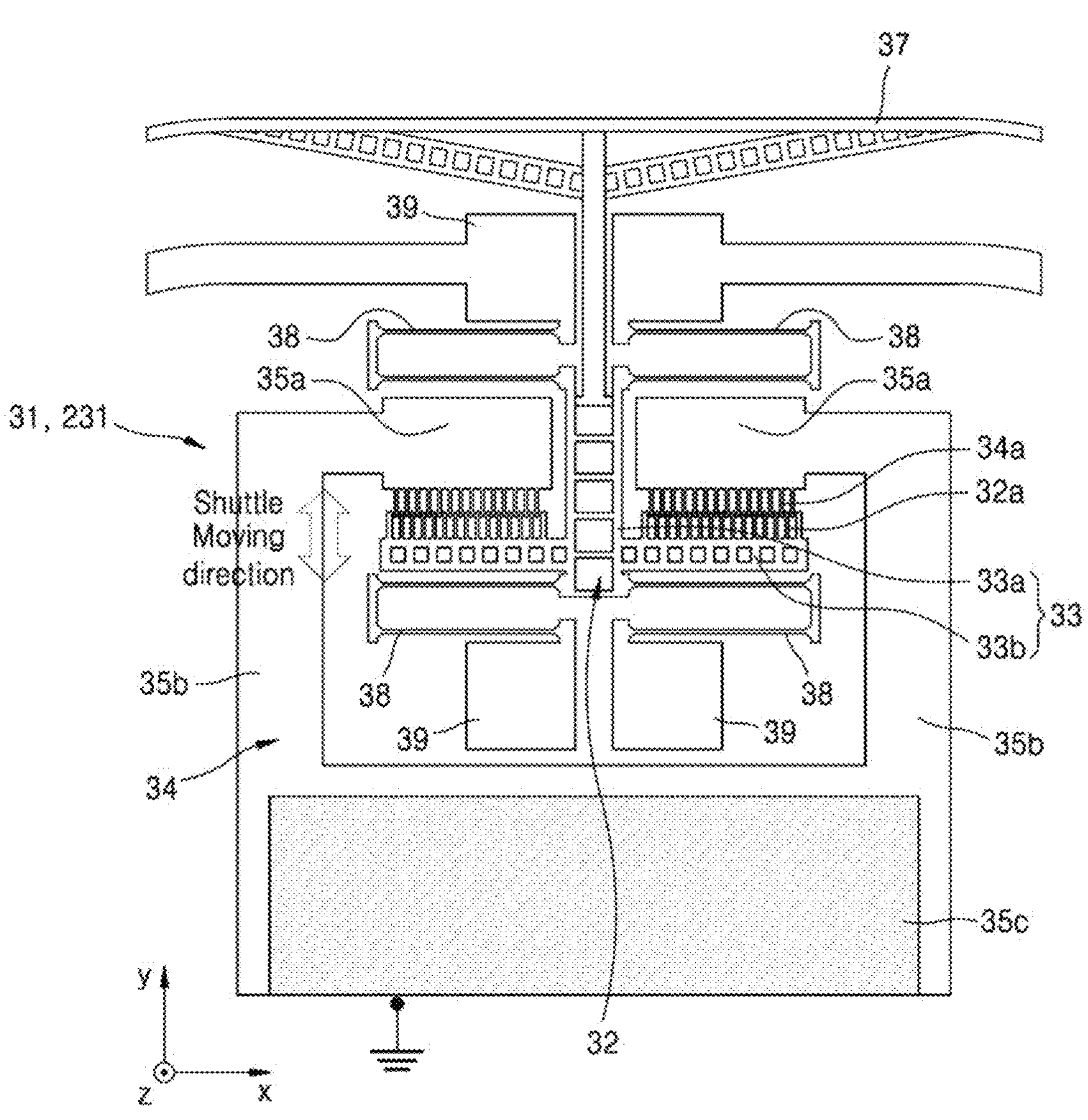
FIG. 28 is a plan view schematically illustrating a second actuator of an optical phase shifter applied to a programmable photonic circuit according to an embodiment.
Figure 29:
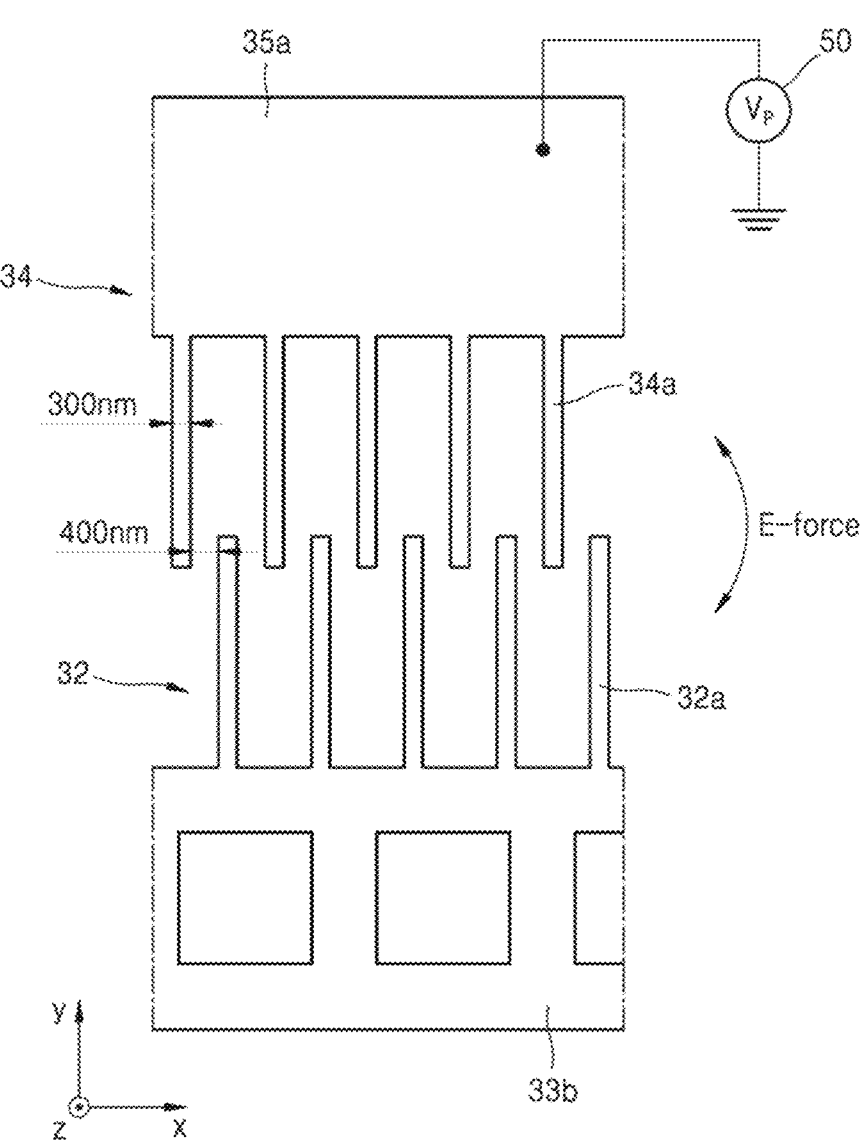
FIG. 29 is an enlarged view of a fixed comb and a movable comb of FIG. 28.

FIG. 28 is a plan view schematically illustrating the second actuator 31 or 231 of the optical phase shifter 30 or 230 applied to the programmable photonic circuit 10, 100, or 200 according to an embodiment. FIG. 29 is an enlarged view of a fixed comb 34*a* and the movable comb 23*b* of FIG. 28, and FIG. 30 is an enlarged view of a spring structure 38 of FIG. 28.

Figure 30:
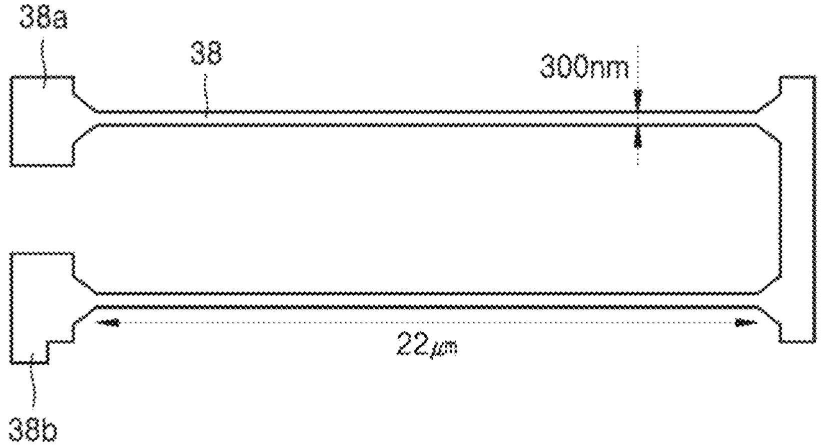
FIG. 30 is an enlarged view of a spring structure of FIG. 28.

Referring to FIGS. 28 to 30, the second actuator 31 or 231 includes the second fixed part 34, the second movable part 32 provided to be movable relative to the second fixed part 34, and an electrode 35*c* on the second fixed part 34 for electrical connection. The second movable part 32 may be provided to move the movable waveguide 37 in the horizontal direction (e.g., the y-axis direction) under control by the control unit 50. The driving voltage $V_p$ may be applied to the second fixed part 34 through the electrode 35*c*, under control by the control unit 50. For example, the second movable part 32 may be electrically grounded. The second actuator 31 or 231 may be provided to be driven in an electrostatic manner. Accordingly, the second actuator 31 or 231 consumes power only during operation, and the power consumption during operation may also be significantly low.

Meanwhile, the movable waveguide 37 may be the perturbation waveguide 35 or 235 or a transmission waveguide. In the programmable photonic circuit 10, 100, or 200 according to an embodiment, in a case in which the movable waveguide 37 is the perturbation waveguide 35 or 235, the fixed waveguide 36 may be the transmission waveguide, and in a case in which the movable waveguide 37 is the transmission waveguide, the fixed waveguide 36 may be the perturbation waveguide 35. Here, the transmission waveguide may be the first waveguide 11 or 211 or the second waveguide 13 or 213.

The second actuator 31 or 231 may be provided to adjust the distance between the perturbation waveguide 35 or 235 and the transmission waveguide in a direction closer to each other when the driving voltage $V_p$ is applied.

To this end, combs may be formed in the second fixed part 34 and the second movable part 32 to engage without colliding with each other in the moving direction (e.g., the y-axis direction) of the second movable part 32.

The second movable part 32 may include, for example, a shuttle 33 provided to be movable in the moving direction (e.g., the y-axis direction) of the second actuator 31 or 231, and one end of the shuttle 33 may be coupled to the movable waveguide 37.

The shuttle 33 may include a first shuttle part 33*a* formed in a shuttle moving direction (e.g., the y-axis direction), and a second shuttle part 33*b* extending from both sides of the first shuttle part 33*a* in a direction forming an angle with respect to the shuttle moving direction, for example, in a direction (e.g., the x-axis direction) perpendicular to the shuttle moving direction. The shuttle moving direction may be the horizontal direction in which the movable waveguide 37 is moved. The first shuttle part 33*a* and the second shuttle part 33*b* of the shuttle 33 may be partially patterned to have a weight that exhibits an appropriate actuation force, and thus may have a plurality of grooves or through holes.

A plurality of combs extending in the shuttle moving direction may be formed in the second shuttle part 33*b* to constitute a movable comb 32*a*. A comb anchor 35*a* of the second fixed part 34, which corresponds to the second shuttle part 33*b* and is spaced apart from the first shuttle part 33*a*, may be formed between the second shuttle part 33*b* and the movable waveguide 37, and a plurality of combs may be formed on a side surface facing the second shuttle part 33*b* of the comb anchor 35*a* to engage the movable comb 32*a* in the shuttle moving direction without colliding with each other, to configure the fixed comb 34*a*.

The second fixed part 34 may include the fixed comb 34*a* connected to the comb anchor 35*a* and extending from a side surface of the comb anchor 35*a* in the moving direction, and an anchor part 35*b* patterned to form a space for accommodating the second shuttle part 33*b* and the movable comb 32*a* extending from the second shuttle part 33*b* in the moving direction. The electrode 35*c* for applying the driving voltage $V_p$ of the second actuator 31 or 231 may be formed on the anchor part 35*b*.

As such, the second fixed part 34 may have the fixed comb 34*a* extending in the shuttle moving direction, the second movable part 32 may have the movable comb 32*a* extending in the shuttle moving direction, and the fixed comb 34*a* and the movable comb 32*a* may be formed to engage each other without a collision. When the driving voltage $V_p$ is applied to the second fixed part 34 and the second movable part 32 is electrically grounded, the second movable part 32 may be moved in the shuttle moving direction by the electric force E-force generated between the fixed comb 34*a* and the movable comb 32*a*, and the length engaged the fixed comb 34*a* and the movable comb 32*a* may vary depending on the movement of the second movable part 32.

Meanwhile, the second movable part 32 may further include a plurality of spring structures 38 that provide a restoring force. FIG. 28 illustrates an example in which one end 38*a* of the plurality of spring structures 38 is connected to the first shuttle part 33*a*, another end 38*b* is connected to a support part 39 of the second movable part 32, and the plurality of spring structures 38 are arranged in parallel to the second shuttle part 33*b*, such that the plurality of spring structures 38 are symmetrical with each other with respect to the driving axis of the first shuttle part 33*a* and provide a restoring force in the moving direction with the comb anchor 35*a* therebetween. A plurality of spring structures 38 may be provided to be symmetrical with each other with respect to the driving axis of the first shuttle part 33*a* of the second movable part 32. FIG. 28 illustrates an example in which four spring structures 38 are provided to be symmetrical with each other with respect to the driving axis, and arranged in front and rear of the engagement structure of the movable comb 32_a_ and the fixed comb 34_a_. The spring structure 38 may be provided in various shapes and arrangements to provide a restoring force to the second movable part 32.

The second actuator 31 or 231 may be formed, for example, when the first actuator 21 or 221 is manufactured. For example, the second movable part 32 and the second fixed part 34 may be formed by forming a silicon oxide layer on a silicon substrate or using an SOI wafer as a substrate, forming a silicon layer thereon, and then patterning the silicon layer. The electrode 35_c_ may be formed on the anchor part 35_b_ of the second fixed part 34. A portion of the silicon oxide layer may be removed through an etching process or the like such that the movable parts of the second movable part 32, that is, the shuttle 33, the movable comb 32_a_, and the spring structure 38, are movable in the horizontal direction (e.g., the y-axis direction).

FIG. 29 is an enlarged view of the engagement structure of the fixed comb 34_a_ and the movable comb 32_a_. As exemplarily illustrated in FIG. 29, the fixed comb 34_a_ and the movable comb 32_a_ may be formed such that the width of a comb pattern forming the fixed comb 34_a_ and the movable comb 32_a_ may be, for example, about 300 nm, and the interval of the fixed comb 34_a_ and the movable comb 32_a_ may be, for example, about 400 nm, and when the driving voltage $V_p$ is applied to the fixed comb 34_a_ of the second fixed part 34, the electric force E-force may be generated between the fixed comb 34_a_ and the movable comb 32_a_, and thus, the second movable part 32 may be moved in the shuttle moving direction, that is, in the horizontal direction (e.g., the y-axis direction). FIG. 30 is an enlarge view of the spring structure 38. As exemplarily illustrated in FIG. 30, the spring structure 38 may be formed to have, for example, a length of about 22 μm and a pattern width of about 300 nm. The numerical data in FIGS. 29 and 30 is only an example, the embodiment is not limited thereto, and the numerical data may vary depending on the configuration and design conditions of the photonic circuit.

The programmable photonic circuit according to the embodiments described herein, and a device including the programmable photonic circuit may be implemented as a hardware component, a software component, or a combination of hardware components and software components. For example, the programmable photonic circuit according to the embodiments and a device including the programmable photonic circuit may be implemented by using a processor of one or more general-purpose computers or special-purpose computers, such as a processor, a controller, an arithmetic logic unit (ALU), a digital signal processor, a microcomputer, a field-programmable array (FPA), a programmable logic unit (PLU), a microprocessor, or any other device configured to execute and respond to instructions. The processor may execute an operating system (OS) and one or more software applications running on the OS.

The processor may also access, store, modify, process, and generate data in response to execution of software. The processor may include a plurality of processing elements and/or a plurality of types of processing elements. For example, the processor may include one or more processors and one controller. In addition, the processor may also include other processing configurations, such as a parallel processor.

The software may include a computer program, code, instructions, or a combination of one or more thereof, and may configure the processor to operate as desired or may independently or collectively instruct the processor. Software and/or data may be embodied permanently or temporarily in any type of machine, component, physical or virtual equipment, computer storage medium or device, or in a propagated signal wave capable of providing instructions or data to or being interpreted by the processor. Software may be distributed on networked computer systems and stored or executed in a distributed manner. The software and data may be stored in one or more computer-readable recording media.

Although the above-described programmable photonic circuit has been described with reference to the embodiments illustrated in the drawings, the embodiments are merely exemplary, and it will be understood by one of skill in the art that various modifications and equivalent embodiments may be made therefrom. Therefore, the disclosed embodiments are to be considered in a descriptive sense only, and not for purposes of limitation. The scope of the disclosure is in the claims rather than the above descriptions, and all differences within the equivalent scope should be construed as being included in the disclosure.

According to a programmable photonic circuit according to an embodiment, the structure of a tunable optical coupler may be simplified, an effective refractive index change of an optical mode of an optical phase shifter may be increased, accordingly, the size of a unit cell may be decreased, and optical loss may be reduced.

According to the programmable photonic circuit according to an embodiment, it is possible to achieve integration in a limited area with low power consumption and low optical loss, and thus, a programmable photonic integrated circuit (PPIC) may be expanded to a large scale.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A photonic circuit comprising:

a tunable optical coupler in which a first waveguide and a second waveguide are provided to correspond to each other in a first section, and the tunable optical coupler comprising a first actuator to move a waveguide of the first waveguide and the second waveguide, as a first movable waveguide, in a first moving direction, and the tunable optical coupler being configured to adjust optical coupling efficiency of an optical signal between the first waveguide and the second waveguide;

an optical phase shifter in which one waveguide of the first waveguide and the second waveguide, and a perturbation waveguide are provided to correspond to each other in a second section, and the optical phase shifter comprising a second actuator to move a waveguide of the one waveguide and the perturbation waveguide, as a second movable waveguide, in the second section, in a second moving direction, and the optical phase shifter being configured to change a phase of an optical signal traveling through the one waveguide, by changing an effective refractive index of an optical mode of the one waveguide according to adjustment of a gap between the one waveguide and the perturbation waveguide; and a control unit configured to control driving signals applied to the first actuator and the second actuator, wherein the first actuator comprises a fixed part and a movable part that is provided to be movable with respect to the fixed part and move the first movable waveguide under control by the control unit, the second actuator comprises a fixed part and a movable part that is provided to be movable with respect to the fixed part of the second actuator and move the second movable waveguide under control by the control unit, wherein a driving signal is applied from the control unit to the fixed part of at least one actuator of the first actuator and the second actuator, wherein one of the first moving direction and the second moving direction is a vertical direction and the other is a horizontal direction, and wherein the first section of the tunable optical coupler comprises a first portion configured to transmit light and a second portion, a thickness of the first portion being greater than a thickness of the second portion.

2. The photonic circuit of claim 1, wherein the one waveguide and the perturbation waveguide have different cross-sectional areas.

3. The photonic circuit of claim 2, wherein the cross-sectional area of the perturbation waveguide is less than the cross-sectional area of the one waveguide.

4. The photonic circuit of claim 1, wherein the perturbation waveguide is a separate structure.

5. The photonic circuit of claim 1, wherein the at least one actuator comprises a microelectromechanical systems (MEMS)-based actuator.

6. The photonic circuit of claim 1, wherein the movable part of the at least one actuator is electrically grounded.

7. The photonic circuit of claim 1, wherein the first actuator is provided to move the waveguide of the first waveguide and the second waveguide, as the first movable waveguide, in a vertical direction.

8. The photonic circuit of claim 7, wherein the first actuator comprises a first fixed part and a first movable part to move the first movable waveguide in the vertical direction, and combs to engage without colliding of the combs with each other in a direction forming an angle with respect to a driving axis of the first movable part are formed in the first fixed part and the first movable part, respectively.

9. The photonic circuit of claim 8, wherein the first actuator is driven in an electrostatic manner, based on the driving signal being applied to the first fixed part and the first movable part being electrically grounded.

10. The photonic circuit of claim 1, wherein the second actuator is provided to adjust the one waveguide and the perturbation waveguide in a direction for the one waveguide and the perturbation waveguide to be closer to each other when the driving signal is applied.

11. The photonic circuit of claim 10, wherein the second actuator is provided to move any one of the one waveguide and the perturbation waveguide in a horizontal direction in the second section.

12. The photonic circuit of claim 11, wherein the second actuator comprises a second fixed part and a second movable part to move the waveguide of the one waveguide and the perturbation waveguide, as the second movable waveguide, in the horizontal direction, combs to engage without colliding of the combs with each other in a direction in which the second movable part is moved are formed in the second fixed part and the second movable part, respectively, and a length at which the comb of the second fixed part and the comb of the second movable part engage each other is changed as the second movable part is moved.

13. The photonic circuit of claim 12, wherein the second actuator is driven in an electrostatic manner, based on the driving signal being applied to the second fixed part and the second movable part being electrically grounded.

14. The photonic circuit of claim 1, wherein the first waveguide and the second waveguide are formed as closed ring-shaped waveguides each having at least two first sections and one second section, and are alternately arranged to form a two-dimensional array and thus configure a recirculating photonic circuit, and wherein the photonic circuit further comprises unit cells, and each of the unit cells comprises the first waveguide or the second waveguide and at least one tunable optical coupler, and comprises or does not comprise at least one optical phase shifter.

15. The photonic circuit of claim 14, wherein the unit cells comprise:

first unit cells each comprising the first waveguide, at least two tunable optical couplers, and one optical phase shifter; and second unit cells each comprising the second waveguide, at least one tunable optical coupler, and one optical phase shifter.

16. The photonic circuit of claim 15, further comprising an array in which the first unit cells and the second unit cells are alternately arranged.

17. The photonic circuit of claim 15, wherein the unit cells further comprise a third unit cell comprising the first waveguide or the second waveguide and at least one tunable optical coupler.

18. The photonic circuit of claim 1, comprising an optical gate to perform 2×2 unitary transformation.

19. The photonic circuit of claim 1, comprising an optical gate array to configure an N×N feed-forward photonic circuit.

* * * * *